(12) United States Patent
Inoue et al.

(10) Patent No.: US 10,845,460 B2
(45) Date of Patent: Nov. 24, 2020

(54) SOUND SOURCE POSITION DETECTION DEVICE, SOUND SOURCE POSITION DETECTION METHOD, SOUND SOURCE POSITION DETECTION PROGRAM, AND RECORDING MEDIUM

(71) Applicant: NEC CORPORATION, Tokyo (JP)

(72) Inventors: Hirofumi Inoue, Tokyo (JP); Naofumi Suzuki, Tokyo (JP); Junichiro Mataga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 378 days.

(21) Appl. No.: 15/577,569

(22) PCT Filed: Jun. 17, 2016

(86) PCT No.: PCT/JP2016/002925
§ 371 (c)(1),
(2) Date: Nov. 28, 2017

(87) PCT Pub. No.: WO2016/208167
PCT Pub. Date: Dec. 29, 2016

(65) Prior Publication Data
US 2018/0164403 A1    Jun. 14, 2018

(30) Foreign Application Priority Data
Jun. 23, 2015   (JP) ................................ 2015-125700

(51) Int. Cl.
*G01S 5/22* (2006.01)
*G01S 5/20* (2006.01)
(Continued)

(52) U.S. Cl.
CPC ................ *G01S 5/22* (2013.01); *G01S 3/808* (2013.01); *G01S 5/18* (2013.01); *G01S 5/20* (2013.01)

(58) Field of Classification Search
CPC . G01S 11/14; G01S 3/808; G01S 5/20; G01S 5/18; G01S 5/22; G01M 3/24
See application file for complete search history.

(56) References Cited

U.S. PATENT DOCUMENTS 9,069,065 B1* 6/2015 Coley .................. G01S 3/8006
2006/0241914 A1* 10/2006 Barnard .................. G01S 3/802
702/189

FOREIGN PATENT DOCUMENTS

JP        8-226865 A      9/1996
JP        10-090106 A     4/1998
(Continued)

OTHER PUBLICATIONS

Osamu Hoshuyama, "Sampling Synchronization Using Radio Broadcast Signals for Distributed Microphone Arrays", IEICE Technical Report, Feb. 23, 2015, pp. 313-316, vol. 114, No. 473.
(Continued)

*Primary Examiner* — Ian J Lobo
(74) *Attorney, Agent, or Firm* — Sughrue Mion, PLLC

(57) ABSTRACT

Signal measurement units each measure a signal output from a sound source, as a measured signal. Reference signal acquisition units each acquire a reference signal. A weighting processing unit creates weighted reference signals by weighting the reference signals. A time synchronization correction calculation unit calculates a time synchronization correction value based on the weighted reference signals. The time synchronization correction value is a correction value for synchronizing the two measured signals. An arrival time difference calculation unit calculates an arrival time difference based on the time synchronization correction value. The arrival time difference is a difference between elapsed times for the two measured signals acquired by respective ones of the pair of signal measurement units to arrive at the respective ones of the pair of signal measure-
(Continued)

ment units. A sound source position calculation unit calculates a position of the sound source based on the arrival time difference.

8 Claims, 14 Drawing Sheets

(51) Int. Cl.
*G01S 3/808* (2006.01)
*G01S 5/18* (2006.01)

(56) References Cited

FOREIGN PATENT DOCUMENTS

| | | |
|---|---|---|
| JP | 2002-071784 A | 3/2002 |
| JP | 2002-162195 A | 6/2002 |
| JP | 2011-504597 A | 2/2011 |
| JP | 2012-169993 A | 9/2012 |
| JP | 2012-242542 A | 12/2012 |
| JP | 2014-232267 A | 12/2014 |

OTHER PUBLICATIONS

Written Opinion for PCT/JP2016/002925, dated Aug. 30, 2016 English translation.
International Search Report for PCT/JP2016/002925, dated Aug. 30, 2016.

\* cited by examiner

SOUND SOURCE POSITION DETECTION DEVICE, SOUND SOURCE POSITION DETECTION METHOD, SOUND SOURCE POSITION DETECTION PROGRAM, AND RECORDING MEDIUM

CROSS REFERENCE TO RELATED APPLICATIONS

This application is a National Stage of International Application No. PCT/JP2016/002925 filed Jun. 17, 2016, claiming priority based on Japanese Patent Application No. 2015-125700 filed Jun. 23, 2015, the contents of all of which are incorporated herein by reference in their entirety.

TECHNICAL FIELD

The present invention relates to a sound source position detection device and the like, for example, to those which detect a position of a sound source on the basis of a sound signal output from the sound source.

BACKGROUND ART

Recently, as an example of a technology of detecting a sound source position, with regard to technology of estimating a hypocenter (generation position) of an earthquake or a generation position of an abnormal sound of a machine, for example, it is well-known to measure a signal from a sound source by means of a plurality of measurement devices and use a difference in propagation characteristics obtained from the signal measurement results. In the technology, it is a premise that time at which the measurement is made is synchronized among the plurality of measurement devices.

Patent Literature 1 (PTL 1) discloses a leakage search apparatus for water pipeline which includes two leakage sound detectors, a master device (sound recording and correlation calculation device) and a slave device (leakage sound recording device). The two leakage sound detectors each detect a leakage sound. The master device records a leakage sound signal, analyzes it and displays the output. The slave device is configured to be attachable and detachable to the master device, and records a leakage sound signal.

The master and slave devices are each provided with a synchronization circuit, and they are placed at respective measurement sites separated from each other. The master and slave devices are set to record data for the same time period since the same time. There, an error in data record time between the two devices is calculated by comparing a difference in record time of a broadcast reception signal (obtained by an FM (Frequency Modulation) broadcast receiver) recorded along with sound pressure data. It thereby becomes possible to check that the recording of sound pressure data was started simultaneously in the master and slave devices. Then, sampling points of the sound pressure data are shifted in a manner to cancel out the error in data record time between the two devices. As a result, it becomes possible to achieve synchronization of the recorded sound pressure data.

Thus, in the technology disclosed in PTL 1, for the purpose of detecting a leakage position of a water pipeline, a radio broadcast receiver (FM broadcast receiver) is provided in each of measurement devices (master and slave devices) placed at respective sites separated from each other and, taking their broadcast reception signals as reference signals, synchronization of sound pressure data is performed.

Here, as other related documents, Patent Literature 2 (PTL 2) to Patent literature 4 (PTL 4) will be noted as below.

CITATION LIST

Patent Literature

[PTL 1] Japanese Laid-Open Patent Application No. H10-90106
[PTL 2] Japanese Laid-Open Patent Application No. 2002-071784
[PTL 3] Japanese Laid-Open Patent Application No. 2002-162195
[PTL 4] Published Japanese translation of PCT application No. 2011-504597

SUMMARY OF INVENTION

Technical Problem

However, in the technology disclosed in PTL 1, there is an issue in that when noise is superposed on the reference signals or when the signal intensity fluctuates, the accuracy of the data synchronization process is decreased and the accuracy of sound source position is decreased.

The present invention has been made in view of such circumstances, and the objective of the present invention is to provide a sound source position detection device and the like which are capable of detecting a position of a sound source accurately.

Solution to Problem

A sound source position detection device of the present invention includes:
a pair of signal measurement units disposed separately from each other and each configured to measure a signal output from a sound source as a measured signal;
reference signal acquisition units each configured to acquire a reference signal;
a weighting processing unit configured to create weighted reference signals by weighting the reference signals measured by the respective reference signal acquisition units;
a time synchronization correction calculation unit configured to calculate a time synchronization correction value on the basis of the weighted reference signals, the time synchronization correction value being a correction value for synchronizing the two measured signals measured by respective ones of the pair of signal measurement units with each other;
an arrival time difference calculation unit configured to calculate an arrival time difference on the basis of the time synchronization correction value, the arrival time difference being a difference between elapsed times for the two measured signals measured by respective ones of the pair of signal measurement units to arrive at the respective ones of the pair of signal measurement units; and
a sound source position calculation unit configured to calculate a position of the sound source on the basis of the arrival time difference.

A sound source position detection method of the present invention includes:

a signal measurement step of measuring a signal output from a sound source by means of a pair of signal measurement units disposed separately from each other, as measured signals;

a reference signal acquisition step of acquiring reference signals by means of reference signal acquisition units;

a weighting processing step of creating weighted reference signals by weighting the reference signals acquired by the reference signal acquisition units;

a time synchronization correction calculation step of calculating a time synchronization correction value on the basis of the weighted reference signals, the time synchronization correction value being a correction value for synchronizing the two measured signals measured by respective ones of the pair of signal measurement units with each other;

an arrival time difference calculation step of calculating an arrival time difference on the basis of the time synchronization correction value, the arrival time difference being a difference between elapsed times for the two measured signals measured by respective ones of the pair of signal measurement units to arrive at the respective ones of the pair of signal measurement units; and a sound source position calculation step of calculating a position of the sound source on the basis of the arrival time difference.

A sound source position detection program of the present invention causes a computer to execute a process including:

a signal measurement step of measuring a signal output from a sound source by means of a pair of signal measurement units disposed separately from each other, as measured signals;

a reference signal acquisition step of acquiring reference signals by means of reference signal acquisition units;

a weighting processing step of creating weighted reference signals by weighting the reference signals acquired by the reference signal acquisition units;

a time synchronization correction calculation step of calculating a time synchronization correction value on the basis of the weighted reference signals, the time synchronization correction value being a correction value for synchronizing the two measured signals measured by respective ones of the pair of signal measurement units with each other;

an arrival time difference calculation step of calculating an arrival time difference on the basis of the time synchronization correction value, the arrival time difference being a difference between elapsed times for the two measured signals measured by respective ones of the pair of signal measurement units to arrive at the respective ones of the pair of signal measurement units; and a sound source position calculation step of calculating a position of the sound source on the basis of the arrival time difference.

A recording medium of the present invention stores a sound source position detection program for causing a computer to execute a process including:

a signal measurement step of measuring a signal output from a sound source by means of a pair of signal measurement units disposed separately from each other, as measured signals;

a reference signal acquisition step of acquiring reference signals by means of reference signal acquisition units;

a weighting processing step of creating weighted reference signals by weighting the reference signals acquired by the reference signal acquisition units;

a time synchronization correction calculation step of calculating a time synchronization correction value on the basis of the weighted reference signals, the time synchronization correction value being a correction value for synchronizing the two measured signals measured by respective ones of the pair of signal measurement units with each other;

an arrival time difference calculation step of calculating an arrival time difference on the basis of the time synchronization correction value, the arrival time difference being a difference between elapsed times for the two measured signals measured by respective ones of the pair of signal measurement units to arrive at the respective ones of the pair of signal measurement units; and a sound source position calculation step of calculating a position of the sound source on the basis of the arrival time difference.

Advantageous Effects of Invention

By using the sound source position detection device and the like according to the present invention, a position of a sound source can be detected with high accuracy.

BRIEF DESCRIPTION OF DRAWINGS

FIGS. 5(a) and (b) are each an example of a raw waveform of a reference signal received by the measurement device. FIG. 5(c) is a diagram showing a correlation function between the raw reference signal waveforms respectively shown in FIGS. 5(a) and (b).

FIGS. 6(a) and (b) are each an example of a temporal waveform obtained by weighting a reference signal received by the measurement device. FIG. 6(c) is a diagram showing a correlation function between the temporal reference signal waveforms respectively shown in FIGS. 6(a) and (b).

FIGS. 7(a) and (b) are each an example of a temporal waveform obtained by weighting a reference signal received by the measurement device. FIG. 7(c) is a diagram showing a correlation function between the temporal reference signal waveforms respectively shown in FIGS. 7(a) and (b).

FIGS. 8(a) and (b) are each an example of a temporal waveform obtained by weighting a reference signal received by the measurement device. FIG. 8(c) is a diagram showing a correlation function between the temporal reference signal waveforms respectively shown in FIGS. 8(a) and (b).

DESCRIPTION OF EMBODIMENTS

First Exemplary Embodiment

Figure 1:
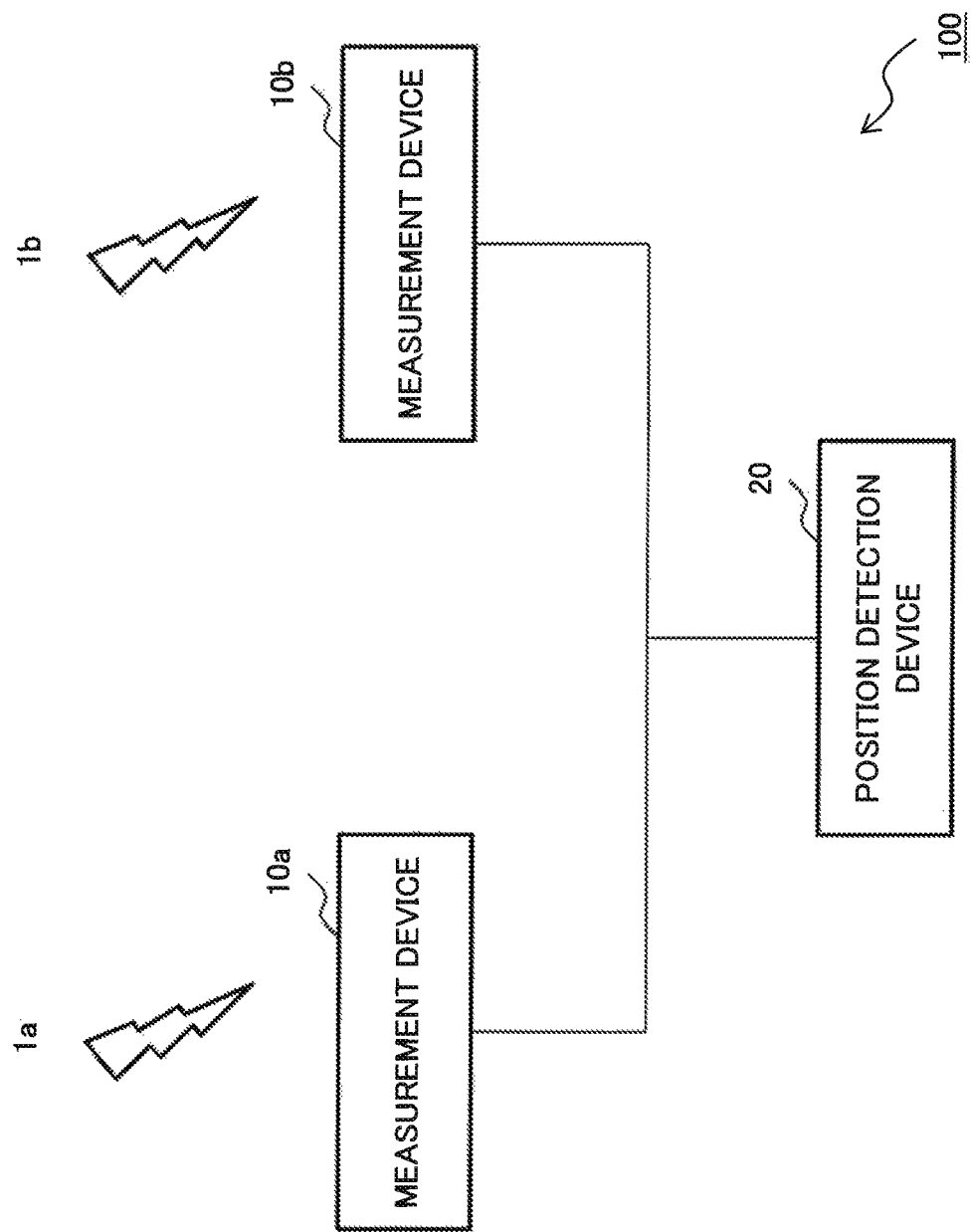
FIG. 1 is a diagram showing a schematic configuration of a sound source position detection device in a first exemplary embodiment of the present invention.

A configuration of a sound source position detection device 100 in a first exemplary embodiment of the present invention will be described. FIG. 1 is a diagram showing a schematic configuration of the sound source position detection device 100 in the first exemplary embodiment of the present invention.

As shown in FIG. 1, the sound source position detection device 100 includes two measurement devices 10a and 10b and a position detection device 20. Here, the two measurement devices 10a and 10b are a pair of measurement devices. The measurement device 10a and the measurement device 10b are disposed separately from each other. When there is no need of distinguishing between the two measurement devices 10a and 10b, they are collectively referred to as a measurement device 10.

Each of the measurement devices 10a and 10b is communicatively coupled with the position detection device 20 by wired or wireless.

As shown in FIG. 1, the measurement device 10a receives a reference signal 1a. The measurement device 10b receives a reference signal 1b.

Figure 2:
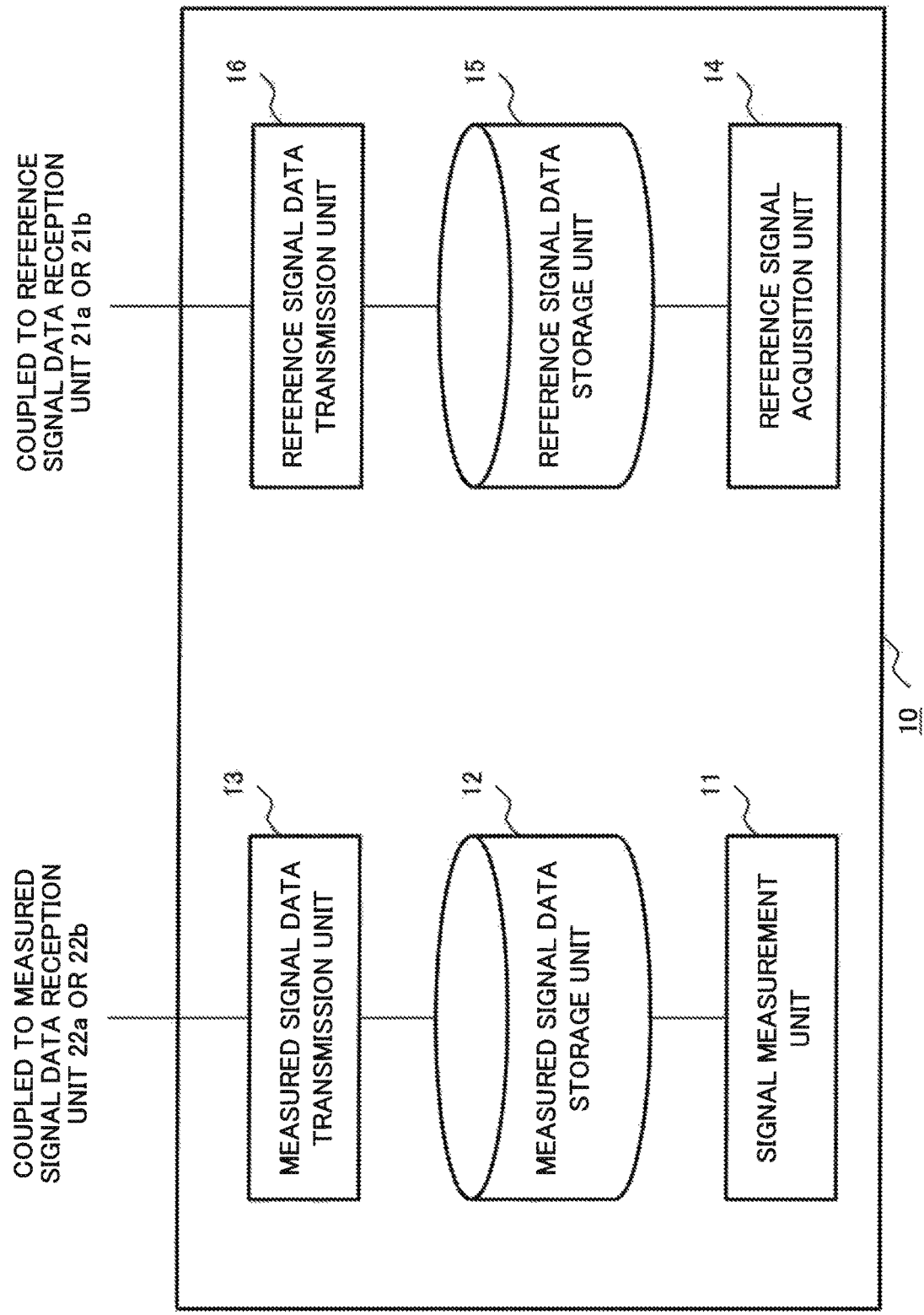
FIG. 2 is a diagram showing a configuration of a measurement device.

Next, configurations of the measurement devices 10a and 10b will be described. FIG. 2 is a diagram showing a configuration of the measurement device 10 (10a, 10b).

Each of the measurement devices 10a and 10b has a configuration described below. That is, as shown in FIG. 2, the measurement device 10 (10a, 10b) includes a signal measurement unit 11, a measured signal data storage unit 12, a measured signal data transmission unit 13, a reference signal acquisition unit 14, a reference signal data storage unit 15 and a reference signal data transmission unit 16.

As shown in FIG. 2, the signal measurement unit 11 is coupled with the measured signal data storage unit 12. The signal measurement unit 11 measures a signal output from a sound source (not illustrated) as a measured signal, based on sound or vibration emitted from the sound source. That is, the signal measurement unit 11 detects sound or vibration emitted from a subject whose position is desired to be identified. Based on the detected sound or vibration, the signal measurement unit 11 measures a measured signal. Here, the measurement device 10a and the measurement device 10b are disposed separately from each other. Accordingly, the signal measurement unit 11 of the measurement device 10a and the signal measurement unit 11 of the measurement device 10b each measure a signal output from the sound source as a measured signal, at a different site from the other's site. The signal measurement unit 11 outputs the measured signal to the measured signal data storage unit 12. The signal measurement unit 11 may perform the signal measurement either constantly or intermittently.

As shown in FIG. 2, the measured signal data storage unit 12 is coupled to the signal measurement unit 11 and the measured signal data transmission unit 13. The measured signal data storage unit 12 stores the measured signal output from the signal measurement unit 11.

As shown in FIG. 2, the measured signal data transmission unit 13 is coupled to the measured signal data storage unit 12. The measured signal data transmission unit 13 is coupled also to a measured signal data reception unit 22a or 22b of the position detection device 20, which will be described later. More specifically, the measured signal data transmission unit 13 of the measurement device 10a is coupled to the measured signal data reception unit 22a of the position detection device 20. The measured signal data transmission unit 13 of the measurement device 10b is coupled to the measured signal data reception unit 22b of the position detection device 20. The measured signal data transmission unit 13 transmits the measured signal stored in the measured signal data storage unit 12 to the position detection device 20.

As shown in FIG. 2, the reference signal acquisition unit 14 is coupled to the reference signal data storage unit 15. The reference signal acquisition unit 14 acquires a reference signal to be used for time synchronization. More specifically, for example, the reference signal acquisition unit 14 receives the reference signal via a radio wave of such as radio broadcast and GPS (Global Positioning System) signals. The reference signal acquisition unit 14 of the measurement device 10a acquires the reference signal 1a. The reference signal acquisition unit 14 of the measurement device 10b acquires the reference signal 1b. The reference signal acquisition unit 14 outputs the acquired reference signal to the reference signal data storage unit 15.

Here, by using a radio wave having high propagation velocity, it can be assumed that a reference signal arrives simultaneously at a plurality of measurement devices 10 among which time synchronization is desired to be performed and, accordingly, the time synchronization among the plurality of measurement devices 10 can be performed highly accurately using the reference signal. While the signal measurement unit 11 performs the measurement, the reference signal acquisition unit 14 may receive a reference signal either constantly or intermittently.

As shown in FIG. 2, the reference signal data storage unit 15 is coupled to the reference signal acquisition unit 14 and the reference signal data transmission unit 16. The reference signal data storage unit 15 stores a reference signal output from the reference signal acquisition unit 14.

As shown in FIG. 2, the reference signal data transmission unit 16 is coupled to the reference signal data storage unit 15. The reference signal data transmission unit 16 is coupled also to the reference signal data reception unit 21a or 21b of the position detection device 20 described later. More specifically, the reference signal data transmission unit 16 of the measurement device 10a is coupled to the reference signal data reception unit 21a of the position detection device 20. The reference signal data transmission unit 16 of the measurement device 10b is coupled to the reference signal data reception unit 21b of the position detection device 20. The reference signal data transmission unit 16 transmits a reference signal stored in the reference signal data storage unit 15 to the position detection device 20.

Figure 3:
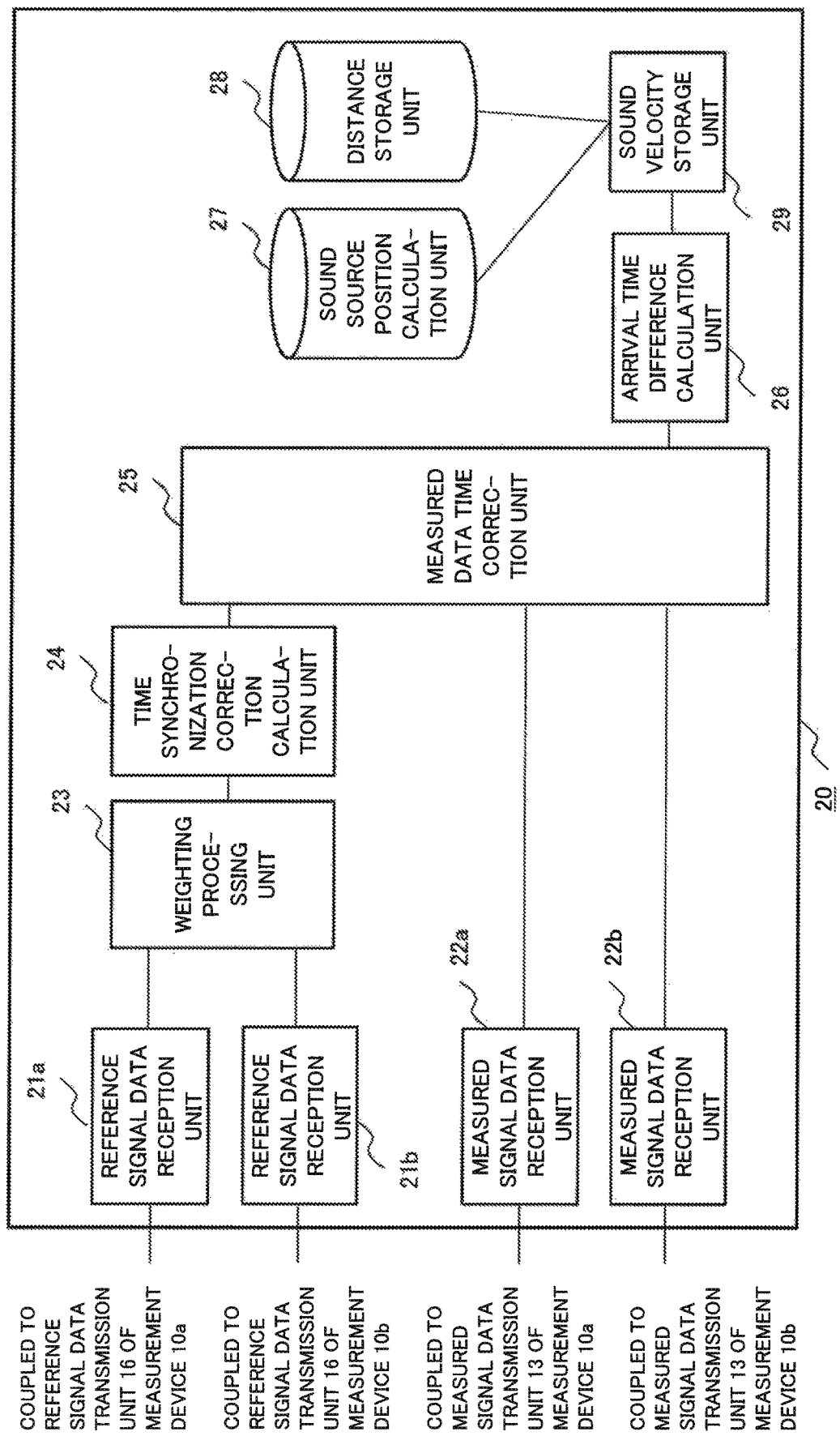
FIG. 3 is a diagram showing a configuration of a position detection device.

Next, a configuration of the position detection device 20 will be described. FIG. 3 is a diagram showing the configuration of the position detection device 20.

As shown in FIG. 3, the position detection device 20 includes the reference signal data reception units 21a and 21b, the measured signal data reception unit 22a and 22b, a weighting processing unit 23, a time synchronization correction calculation unit 24, a measured data time correction unit 25, an arrival time difference calculation unit 26, a sound velocity storage unit 27, a distance storage unit 28 and a sound source position calculation unit 29.

As shown in FIG. 3, the reference signal data reception units 21a and 21b are coupled to the weighting processing unit 23. The reference signal data reception unit 21a is coupled also to the reference signal data transmission unit 16 of the measurement device 10a. The reference signal data reception unit 21a receives a reference signal from the reference signal data transmission unit 16 of the measurement device 10a. The reference signal data reception unit 21b is coupled to the reference signal data transmission unit 16 of the measurement device 10b. The reference signal data reception unit 21b receives a reference signal from the reference signal data transmission unit 16 of the measurement device 10b. The reference signal data reception units 21a and 21b output the received reference signals to the weighting processing unit 23.

As shown in FIG. 3, the measured signal data reception units 22a and 22b are coupled to the measured data time correction unit 25. The measured signal data reception unit 22a is coupled also to the measured signal data transmission unit 13 of the measurement device 10a. The measured signal data reception unit 22a receives a measured signal from the measured signal data transmission unit 13 of the measurement device 10a. The measured signal data reception unit 22b is coupled to the measured signal data transmission unit 13 of the measurement device 10b. The measured signal data reception unit 22b receives a measured signal from the measured signal data transmission unit 13 of the measurement device 10b. The measured signal data reception units 22a and 22b output the received measured signals to the measured data time correction unit 25.

As shown in FIG. 3, the weighting processing unit 23 is coupled to the reference signal data reception units 21a and 21b and the time synchronization correction calculation unit 24. The weighting processing unit 23 weights each of the reference signals measured by the reference signal acquisition units 14 of respective ones of the measurement devices 10a and 10b, thereby generating weighted reference signals. The weighting is performed partitioning each of the reference signals at a constant interval of time. The weighting processing unit 23 outputs the weighted reference signals to the time synchronization correction calculation unit 24.

As shown in FIG. 3, the time synchronization correction calculation unit 24 is coupled to the weighting processing unit 23 and the measured data time correction unit 25. The time synchronization correction calculation unit 24 calculates a time synchronization correction value on the basis of the weighted reference signals. The time synchronization correction value is a correction value for synchronizing the two measured signals measured by respective ones of the pair of signal measurement units 11 (the signal measurement unit 11 of the measurement device 10a and the signal measurement unit 11 of the measurement device 10b) with each other. The time synchronization correction calculation unit 24 outputs the time synchronization correction value to the measured data time correction unit 25.

As shown in FIG. 3, the measured data time correction unit 25 is coupled to the measured signal data reception units 22a and 22b, the time synchronization correction calculation unit 24 and the arrival time difference calculation unit 26. Based on the time synchronization correction value, the measured data time correction unit 25 performs time synchronization correction on the measured signals, thereby creating time synchronization corrected measured signals. The measured data time correction unit 25 outputs the time synchronization corrected measured signals to the arrival time difference calculation unit 26.

As shown in FIG. 3, the arrival time difference calculation unit 26 is coupled to the measured data time correction unit 25 and the sound source position calculation unit 29. The arrival time difference calculation unit 26 calculates an arrival time difference, using the time synchronization corrected measured signals. The arrival time difference is a difference between elapsed times for the two measured signals acquired by respective ones of the pair of signal measurement units (the signal measurement unit 11 of the measurement device 10a and the signal measurement unit 11 of the measurement device 10b) to arrive at the respective ones of the pair of signal measurement units 11. Here, the time synchronization corrected measured signals have been created on the basis of the time synchronization correction value, as described earlier. Accordingly, it can be said that the arrival time difference calculation unit 26 calculates the arrival time difference on the basis of the time synchronization correction value. Here, for the calculation of the arrival time difference, for example, a correlation function is used. The arrival time difference calculation unit 26 outputs the calculated arrival time difference to the sound source position calculation unit 29.

As shown in FIG. 3, the sound velocity storage unit 27 is coupled to the sound source position calculation unit 29. In the sound velocity storage unit 27, a sound velocity value for measured signal is stored. Here, the sound velocity value may be either a theoretical value or an actually measured value.

As shown in FIG. 3, the distance storage unit 28 is coupled to the sound source position calculation unit 29. In the distance storage unit 28, a distance between the pair of measurement devices 10a and 10b is stored. More specifically, in the distance storage unit 28, a distance between the pair of signal measurement units 11 (the signal measurement unit 11 of the measurement device 10a and the signal measurement unit 11 of the measurement device 10b) is stored.

As shown in FIG. 3, the sound source position calculation unit 29 is coupled to the arrival time difference calculation unit 26, the sound velocity storage unit 27 and the distance storage unit 28. The sound source position calculation unit 29 calculates a position of the sound source on the basis of the arrival time difference calculated by the arrival time difference calculation unit 26.

Here, a distance between the measurement device 10a (more specifically, the signal measurement unit 11 of the measurement device 10a) and the sound source is denoted by L1. A distance between the measurement device 10b (more specifically, the signal measurement unit 11 of the measurement device 10b) and the sound source is denoted by L2. Further, the sound velocity is denoted by c, and the arrival time difference by τ. In that case, a relation of L1, L2, c and τ is expressed as in an equation 1.

$$L1 = (L2 - c\tau)/2 \quad \text{(equation 1)}$$

For example, by using the equation 1, the sound source position calculation unit 29 can calculate the distance L1 between the measurement device 10a (more specifically, the signal measurement unit 11 of the measurement device 10a) and the sound source. As a result, the sound source position detection device 100 can detect a position of the sound source.

The configuration of the sound source position detection device 100 has been described above.

Figure 4:
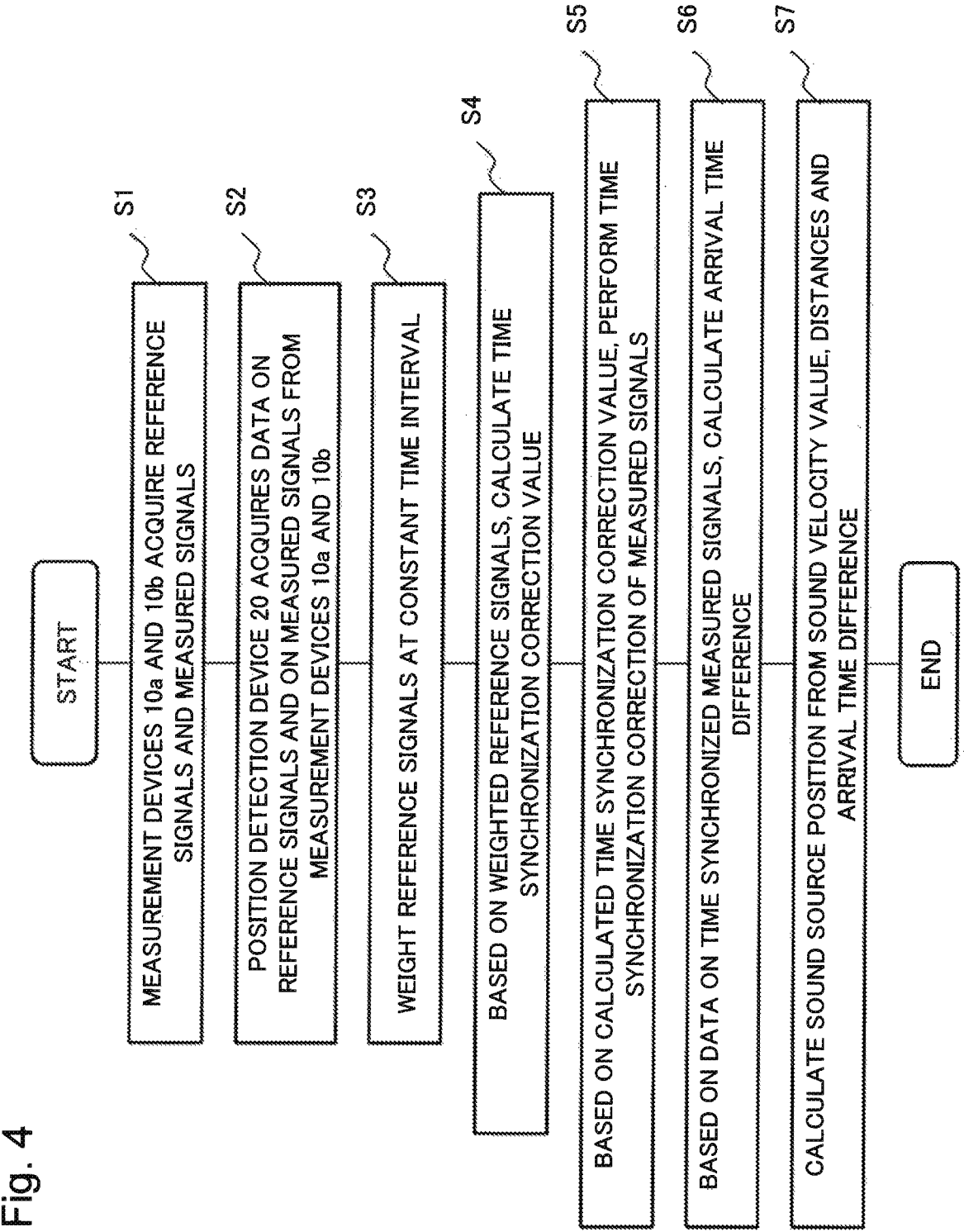
FIG. 4 is a diagram showing an operational flow of the sound source position detection device in the first exemplary embodiment of the present invention.

Next, operation of the sound source position detection device 100 will be described. FIG. 4 is a diagram showing an operational flow of the sound source position detection device 100.

As shown in FIG. 4, first, the measurement devices 10a and 10b each acquire a reference signal and a measured signal (S1).

Specifically, the signal measurement unit 11 of each of the measurement devices 10a and 10b measures a signal output from a sound source, as a measured signal, based on sound or vibration emitted from the sound source. Subsequently, the signal measurement unit 11 of each of the measurement devices 10a and 10b outputs the measured signal to the measured signal data storage unit 12. Then, the measured signal data transmission unit 13 of each of the measurement devices 10a and 10b transmits the measured signal stored in the measured signal data storage unit 12 to the position detection device 20.

The reference signal acquisition unit 14 of each of the measurement devices 10a and 10b acquires a reference signal to be used for time synchronization, via a radio wave of radio broadcast or the GPS. Subsequently, the reference signal acquisition unit 14 of each of the measurement devices 10a and 10b outputs the acquired reference signal to the reference signal data storage unit 15. Then, the reference signal data transmission unit 16 of each of the measurement devices 10a and 10b transmits the reference signal stored in the reference signal data storage unit 15 to the position detection device 20.

Next, the position detection device 20 acquires data on the reference signals and the measured signals from the measurement devices 10a and 10b (S2).

Specifically, the reference signal data reception unit 21a receives the reference signal transmitted from the reference signal data transmission unit 16 of the measurement device 10a. The reference signal data reception unit 21b receives the reference signal transmitted from the reference signal data transmission unit 16 of the measurement device 10b. The reference signal data reception units 21a and 21b output the received reference signals to the weighting processing unit 23.

The measured signal data reception unit 22a receives the measured signal transmitted from the measured signal data transmission unit 13 of the measurement device 10a. The measured signal data reception unit 22b receives the measured signal transmitted from the measured signal data transmission unit 13 of the measurement device 10b.

Next, the position detection device 20 weights the reference signals at a constant interval of time (S3).

Specifically, the weighting processing unit 23 creates weighted reference signals by weighting each of the reference signals measured by the reference signal acquisition units 14 of respective ones of the measurement devices 10a and 10b, at a constant interval of time. The weighting processing unit 23 outputs the weighted reference signals to the time synchronization correction calculation unit 24.

Next, based on the weighted reference signals, the position detection device 20 calculates a time synchronization correction value (S4).

Specifically, the time synchronization correction calculation unit 24 calculates the time synchronization correction value, based on the weighted reference signals. The time synchronization correction value is, as described earlier, a correction value for synchronizing the two measured signals measured by respective ones of the pair of signal measurement units 11 (the signal measurement unit 11 of the measurement device 10a and the signal measurement unit 11 of the measurement device 10b) with each other. The time synchronization correction calculation unit 24 outputs the time synchronization correction value to the measured data time correction unit 25.

Next, based on the calculated time synchronization correction value, the position detection device 20 performs a time synchronization correction process on data on the measured signals (S5).

Specifically, the measured data time correction unit 25 creates time synchronization corrected measured signals by performing time synchronization correction on the measured signals on the basis of the time synchronization correction value. The measured data time correction unit 25 outputs the time synchronization corrected measured signals to the arrival time difference calculation unit 26.

Next, based on data on the time synchronization corrected measured signals, the position detection device 20 calculates an arrival time difference (S6).

Specifically, using the time synchronization corrected measured signals, the arrival time difference calculation unit 26 calculates the arrival time difference. The arrival time difference is, as described earlier, a difference between elapsed times for the two measured signals acquired by respective ones of the pair of signal measurement units 11 (the signal measurement unit 11 of the measurement device 10a and the signal measurement unit 11 of the measurement device 10b) to arrive at the respective ones of the pair of signal measurement units 11. Here, for the calculation of the arrival time difference, a correlation function is used, for example. The arrival time difference calculation unit 26 outputs the calculated arrival time difference to the sound source position calculation unit 29.

Finally, from the sound velocity value, distances and arrival time difference, the position detection device 20 calculates a position of the sound source (S7).

Here, the sound velocity c, the distances L1 and L2, and the arrival time difference τ are defined as described earlier. Accordingly, by using the equation 1, the sound source position calculation unit 29 of the position detection device 20 can calculate the distance L1 between the measurement device 10a (more specifically, the signal measurement unit 11 of the measurement device 10a) and the sound source. As a result, the sound source position detection device 100 can detect a position of the sound source.

The operation of the sound source position detection device 100 has been described above.

As has been described above, the sound source position detection device 100 in the first exemplary embodiment of the present invention includes the pair of signal measurement units 11, the pair of reference signal acquisition units 14, the weighting processing unit 23, the time synchronization correction calculation unit 24, the arrival time difference calculation unit 26 and the sound source position calculation unit 29.

The pair of signal measurement units 11 are disposed separately from each other, and each measure a signal output from a sound source as a measured signal. The reference signal acquisition units 14 each acquire a reference signal. The weighting processing unit 23 creates weighted reference signals by weighting the reference signals measured by the reference signal acquisition units 14. The time synchronization correction calculation unit 24 calculates a time synchronization correction value, based on the weighted reference signals. Here, the time synchronization correction value is a correction value for synchronizing the two measured signals measured by respective ones of the pair of signal measurement units 11. The arrival time difference calculation unit 26 calculates an arrival time difference, based on the time synchronization correction value. Here, the arrival time difference is a difference between elapsed times for the two measured signals acquired by respective ones of the pair of signal measurement units 11 to arrive at the respective ones of the pair of signal measurement units 11. The sound source position calculation unit 29 calculates a position of the sound source, based on the arrival time difference.

Thus, the weighting processing unit 23 creates the weighted reference signals by weighting the reference signals measured by the reference signal acquisition units 14. Subsequently, the time synchronization correction calculation unit 24 calculates the time synchronization correction value, based on the weighted reference signals. In that way, it becomes possible to calculate the time synchronization correction value more exactly, compared with a case of not weighting the reference signals. The arrival time difference calculation unit 26 calculates the arrival time difference, based on the more exact time synchronization correction value. Accordingly, it becomes possible to calculate the arrival time difference more exactly, compared with a case of not weighting the reference signals. Then, the sound source position calculation unit 29 calculates a position of the sound source, based on the more exact arrival time difference. Accordingly, it becomes possible to calculate the position of the sound source more exactly, compared with a case of not weighting the reference signals.

As a result, by using the sound source position detection device 100 according to the present invention, it becomes possible to detect a position of a sound source with high accuracy.

The operation and effect of the sound source position detection device 100 will be described in more detail. A case considered here is that where a sampling frequency is the same for timers (not illustrated) provided respectively in the measurement device 10a and the measurement device 10b and a value whose correction is necessary in terms of time synchronization is only a measurement start time difference.

Figure 5A:
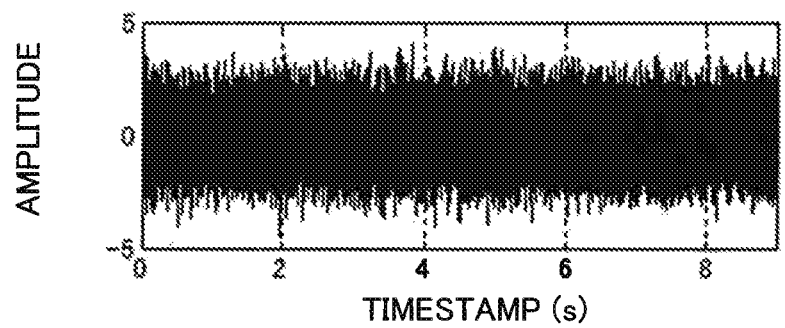
FIGS. 5(a)-5(c) are reference diagrams for explaining operation and effect of the sound source position detection device in the first exemplary embodiment of the present invention.
Figure 5B:
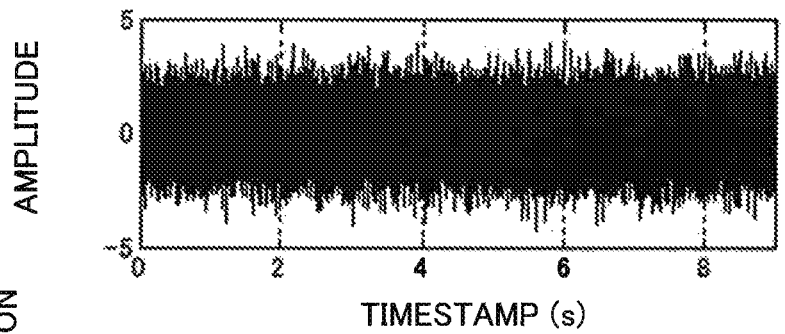
Figure 5C:
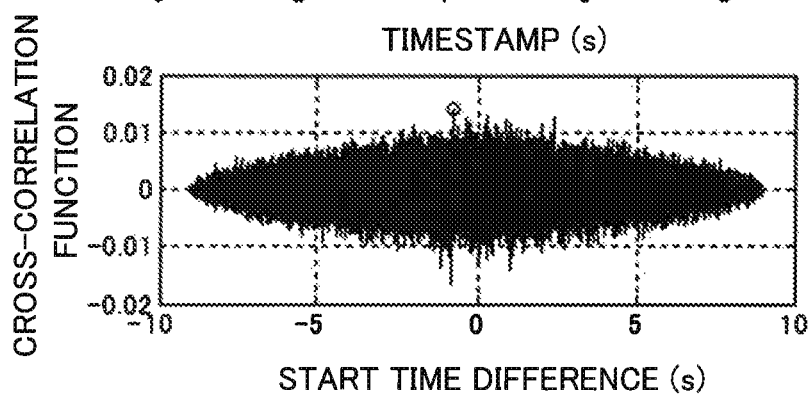

FIGS. 5(a)-5(c) are reference diagrams for explaining the operation and effect of the sound source position detection device 100. FIG. 5(a) is an example of a raw waveform of a reference signal received by the measurement device 10a. FIG. 5(b) is an example of a raw waveform of a reference signal received by the measurement device 10b. FIG. 5(c) is a diagram showing a correlation function between the raw reference signal waveform shown in FIG. 5(a) and the raw reference signal waveform shown in FIG. 5(b).

As the reference signals, a signal including sound sections and silent sections, such as of radio broadcast, is assumed. As shown in FIG. 5(a) and FIG. 5(b), in silent sections, noise of the reference signal acquisition unit 14 of the measurement device 10a or 10b is measured.

For example, when the measurement start time of the measurement device 10a is one second earlier than that of the measurement device 10b, the cross-correlation function should have a maximum value at one second, corresponding to the difference between the measurement start times, in an ideal condition having no noise.

However, when noise is present, if a cross-correlation function is calculated without weighting the reference signals received by the measurement device 10a and the measurement device 10b, the cross-correlation function has a maximum value at a time difference not equal to one second, as shown in FIG. 5(a). Accordingly, if not weighting the reference signals, the measured data time correction unit 25 cannot perform time synchronization correction exactly.

On the other hand, if weighting is performed on the reference signals received by the measurement device 10a and the measurement device 10b, shown in FIGS. 5(a) and (b), the result becomes as follows.

Figure 6:
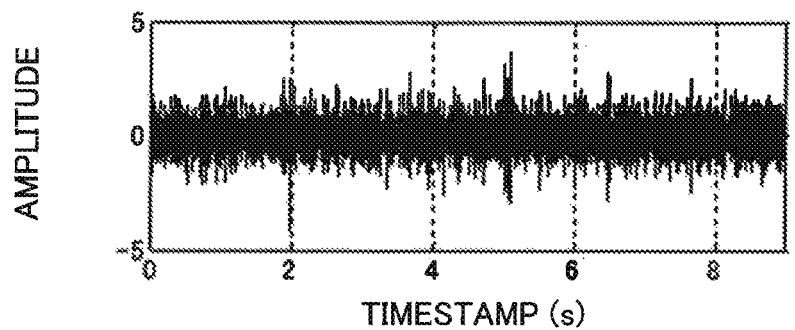
FIGS. 6(a)-6(c) are reference diagrams for explaining operation and effect of the sound source position detection device in the first exemplary embodiment of the present invention.
Figure 6:
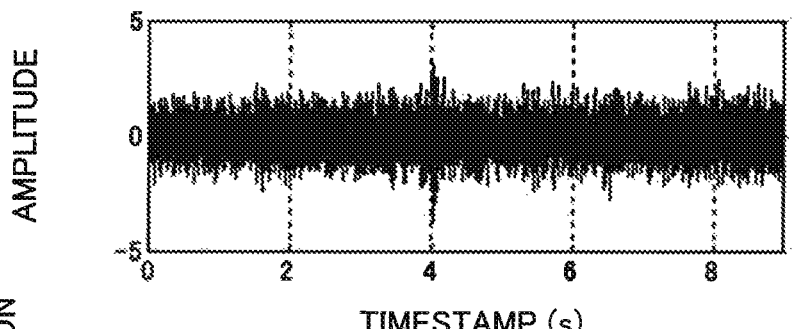
Figure 6:
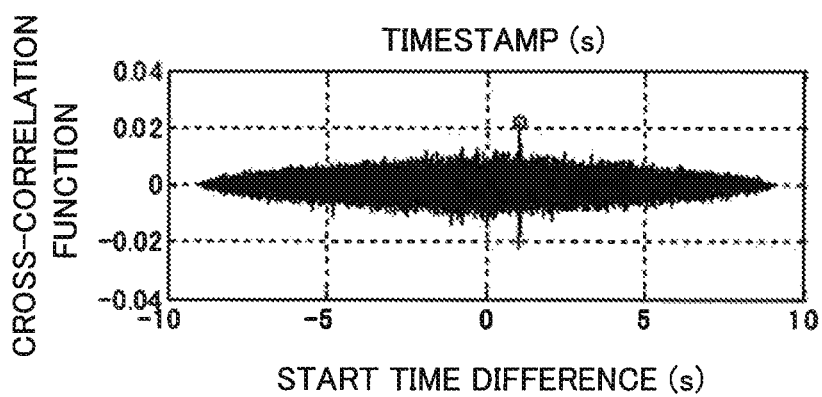

FIGS. 6(a)-6(c) are reference diagrams for explaining the operation and effect of the sound source position detection device 100. FIG. 6(a) is an example of a temporal waveform obtained by weighting the reference signal received by the measurement device 10a. FIG. 6(b) is an example of a temporal waveform obtained by weighting the reference signal received by the measurement device 10b. FIG. 6(c) is a diagram showing a correlation function between the temporal reference signal waveform shown in FIG. 6(a) and the temporal reference signal waveform shown in FIG. 6(b).

Here, as an example of a way of weighting, a noise magnitude is estimated from silent sections, and multiplication by the square of a value obtained by subtracting the noise magnitude, which is taken as a weight, is performed at a constant interval of time.

Comparison of FIG. 6(a) to (c) with FIG. 5(a) to (c) will be made below. In FIGS. 5(a) and (b), there is no point at which the amplitude shows relatively large change, over the entire timestamp range. In contrast, as shown in FIG. 6(a), in the temporal waveform for the measurement device 10a, a point at which the amplitude is relatively larger than that in the silent sections occurs around five seconds. As shown in FIG. 6(b), in the temporal waveform for the measurement device 10b, a point at which the amplitude is relatively larger than that in the silent sections occurs around four seconds. In FIG. 5(c), while the amplitude gradually decreases with departing from the center corresponding to zero second start time difference, there is noticed no point at which the time difference amplitude is relatively large. In contrast, as shown in FIG. 6(c), the cross-correlation function between the weighted reference signals has a maximum value at one second, which indicates that the measurement start time difference can be correctly calculated.

Figure 7:
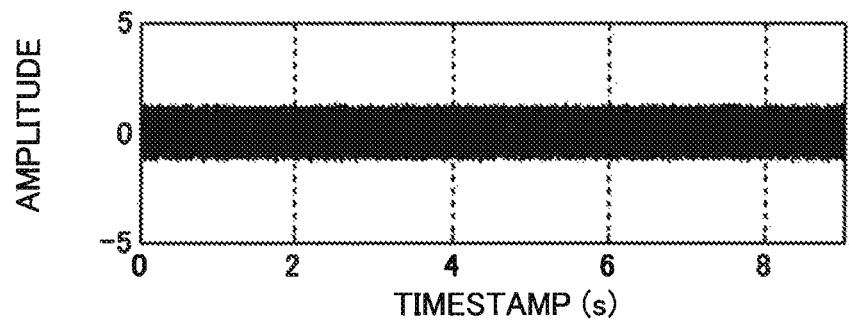
FIGS. 7(a)-7(c) are reference diagrams for explaining operation and effect of the sound source position detection device in the first exemplary embodiment of the present invention.
Figure 7:
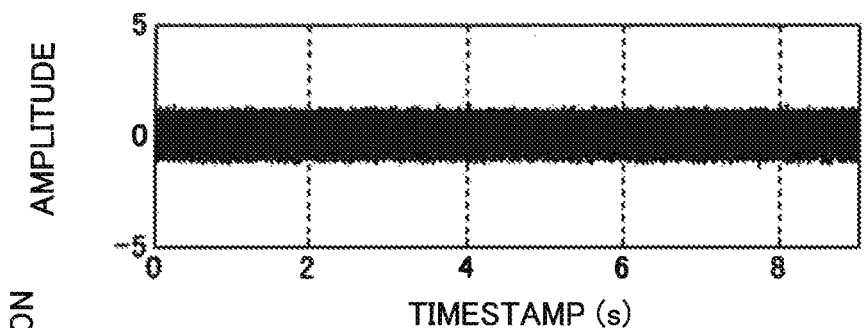
Figure 7:
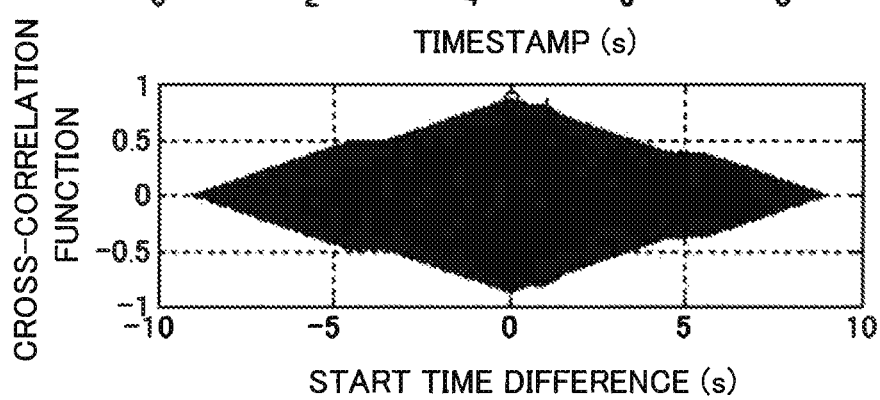

Further, another example of a weighting process will be described below. FIGS. 7(a)-7(c) are reference diagrams for explaining the operation and effect of the sound source position detection device 100. FIG. 7(a) is an example of a temporal waveform obtained by weighting a reference signal received by the measurement device 10a. FIG. 7(b) is an example of a temporal waveform obtained by weighting a reference signal received by the measurement device 10b. FIG. 7(c) is a diagram showing a correlation function between the temporal reference signal waveform shown in FIG. 7(a) and the temporal reference signal waveform shown in FIG. 7(b).

In the example of FIG. 7(a) to (c), as the reference signals received by the measurement device 10a and the measurement device 10b, a signal including both a periodic signal and a non-periodic signal is assumed.

If the measurement device 10a starts measurement one second earlier than the measurement device 10b, the cross-correlation function has a maximum value at one second, corresponding to the difference between the measurement start times, in an ideal condition having no noise.

When the measurement start time difference is calculated using a maximum value of the cross-correlation function, if the reference signals are periodic signals, a difference between a maximum value of the cross-correlation function and the next largest value becomes small and, accordingly, it is possible that the measurement start time difference is calculated incorrectly.

For example, if the correlation function is calculated without performing any weighting process on the reference signals, as shown in FIG. 7(c), the correlation function has a maximum value at a time difference not equal to one second and, accordingly, time synchronization correction cannot be performed exactly.

On the other hand, if weighting is performed on the reference signals received by the measurement device 10a and the measurement device 10b, shown in FIGS. 7(a) and (b), the result becomes as follows.

Figure 8A:
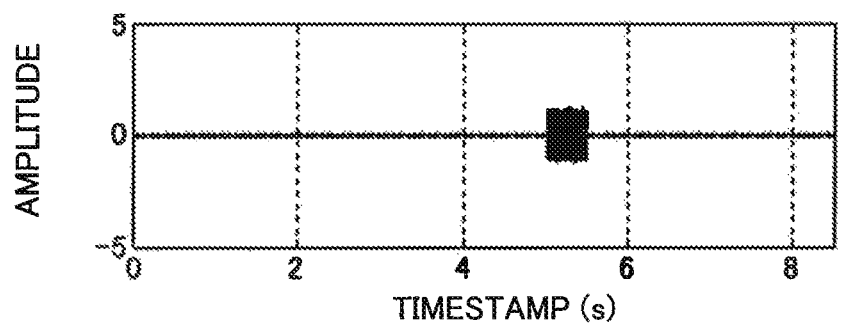
FIGS. 8(a)-8(c) are reference diagrams for explaining operation and effect of the sound source position detection device in the first exemplary embodiment of the present invention.
Figure 8B:
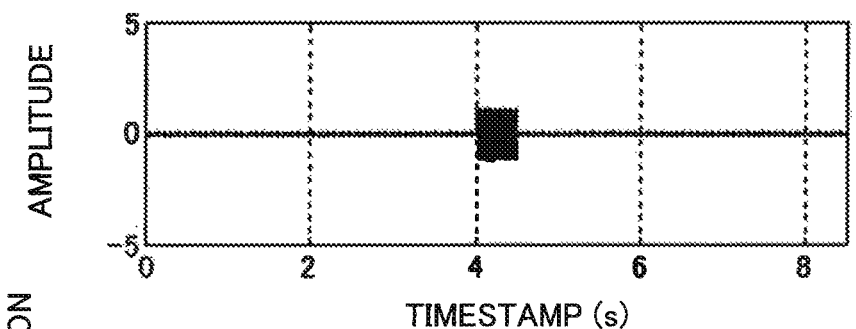
Figure 8C:
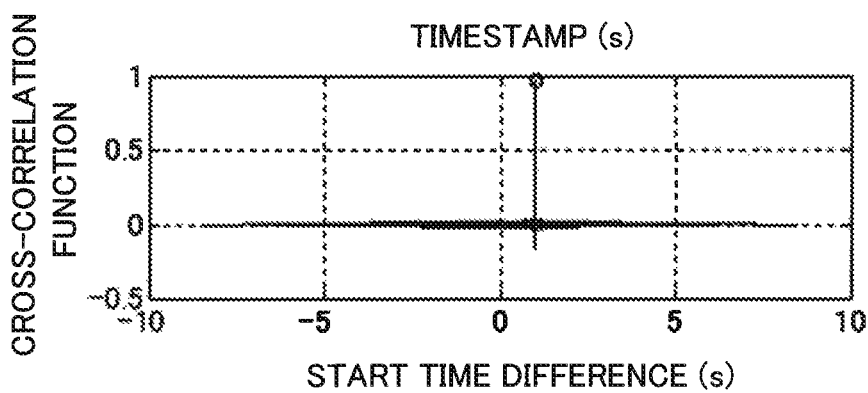

FIGS. 8(a)-8(c) are reference diagrams for explaining the operation and effect of the sound source position detection device 100. FIG. 8(a) is an example of a temporal waveform obtained by weighting the reference signal received by the measurement device 10a. FIG. 8(b) is an example of a temporal waveform obtained by weighting the reference signal received by the measurement device 10b. FIG. 8(c) is a diagram showing a correlation function between the temporal reference signal waveform shown in FIG. 8(a) and the temporal reference signal waveform shown in FIG. 8(b).

Here, as an example of a weighting process, multiplication by a difference between a maximum value of the auto-correlation function and the next largest value, which is taken as a weight, is performed at a constant interval of time. As a result, around five seconds in the waveform for the measurement device 10a and around four seconds in the waveform for the measurement device 10b, which are each a non-periodic signal section, the amplitude is relatively larger than in the remaining sections which are periodic signal sections.

The cross-correlation function between these weighted reference signals has a maximum value at one second, which indicates that the measurement start time difference can be calculated correctly. That is, according to the sound source position calculation device 100 of the present exemplary embodiment, the measurement start time difference can be calculated exactly, by performing the weighting process on received reference signals. As a result, by performing time synchronization correction between the measurement device 10a and the measurement device 10b using the exact measurement start time difference, the accuracy of calculating a sound source position can be improved.

Here, comparison with related PTL 1 will be made. As described above, without weighting of reference signals, which is performed in the present exemplary embodiment, synchronization cannot be accurately performed when noise is superposed. However, PTL 1 discloses nothing in this respect.

Comparison with related PTL 2 will be made. As described above, without weighting of reference signals, which is performed in the present exemplary embodiment, synchronization cannot be accurately performed when noise is superposed. However, PTL 2 discloses nothing in this respect. Further, by only performing filtering in the frequency domain as in the technology disclosed in PTL 2, synchronization cannot be accurately performed when noise is superposed in the same frequency range. In contrast, according to the invention of the present exemplary embodiment, accurate synchronization can be performed because of weighting in the time domain.

Comparison with related PTL 3 will be made. In the invention in the present exemplary embodiment, weighting has an effect on the accuracy of time synchronization. In contrast, in the technology disclosed in PTL 3, weighting has an effect on a filtering process and averaging. Accordingly, there is difference in operation and effect. Specifically, in the technology disclosed in PTL 1, smoothing is performed by a filtering process, but high frequency components of a reference signal are removed when the smoothing is performed and, accordingly, the accuracy of time synchronization deteriorates. In contrast, in the invention in the present exemplary embodiment, weighting is performed instead of smoothing and, accordingly, the high frequency components can be maintained, which enables accurate time synchronization. Further, constantly averaging at a certain interval of time which is performed in PTL 3 and calculating a weight from an auto-correlation value which is performed in the invention in the present exemplary embodiment are different from each other. In the technology of PTL 3, only performing the constant averaging at a certain interval of time has a possibility of unintentionally emphasizing a time range where an auto-correlation value of a reference signal may become large and accordingly deteriorate the synchronization accuracy. In contrast, in the invention in the present exemplary embodiment, by performing the weighting such that contribution of a time section having a large auto-correlation value be small, the synchronization can be performed accurately.

Comparison with related PTL 4 will be made. In the technology disclosed in PTL 4, only a simple signal correlation process is performed. Accordingly, in the technology disclosed in PTL 4, there is no disclosure of performing accurate synchronization when noise is superposed. In the technology disclosed in PTL 4, a signal correlation process is performed only simply, but calculating a weight from an auto-correlation value, as in the invention in the present exemplary embodiment, is not performed. In contrast, in the invention in the present exemplary embodiment, by performing the weighting such that contribution of a time section having a large auto-correlation value be small, the synchronization can be performed accurately.

Further, in the sound source position detection device 100 in the first exemplary embodiment of the present invention, the weighting processing unit 23 may create two weighted reference signals by weighting each of two reference signals acquired by the pair of reference signal acquisition units 14 on the basis of the reference signal's signal to noise ratio. In that way, weighted reference signals can be easily created.

In the sound source position detection device 100 in the first exemplary embodiment of the present invention, the weighting processing unit 23 may also create two weighted reference signals by weighting each of two reference signals acquired by the pair of reference signal acquisition unit 14 on the basis of the reference signal's auto-correlation value. In that way, weighted reference signals can be easily created.

In the sound source position detection device 100 in the first exemplary embodiment of the present invention, the time synchronization correction value is a correction value for a measurement start time difference which is a difference between the pair of signal measurement units 11 in time to start measuring a measured signal. Accordingly, based on the correction value for the measurement start time difference, an arrival time difference can be calculated.

In the sound source position detection device 100 in the first exemplary embodiment of the present invention, the reference signals are radio broadcast signals. Accordingly, reference signals keeping precise time can be easily acquired.

A sound source position detection method in the first exemplary embodiment of the present invention includes a signal measurement step, a reference signal acquisition step, a weighting processing step, a time synchronization correction calculation step, an arrival time difference calculation step and a sound source position calculation step.

In the signal measurement step, a signal output from a sound source is measured as a measured signal by each of the pair of signal measurement units 11 which are disposed separately from each other. In the reference signal acquisition step, a reference signal is acquired by each of the reference signal acquisition units 14. In the weighting processing step, weighted reference signals are created by weighting the reference signals acquired by the reference signal acquisition units 14. In the time synchronization correction calculation step, a time synchronization correction value is calculated on the basis of the weighted reference signals. The time synchronization correction value is a correction value for synchronizing the two measured signals measured by respective ones of the pair of signal measurement units with each other. In the arrival time difference calculation step, an arrival time difference is calculated on the basis of the time synchronization correction value. The arrival time difference is a difference between elapsed times for the two measured signals measured by respective ones of the pair of signal measurement units 11 to arrive at the respective ones of the pair of signal measurement units 11. In the sound source position calculation step, a position of the sound source is calculated on the basis of the arrival time difference.

Also by the sound source position detection method, the above-described effect achieved by the sound source position detection device 100 can be achieved.

Further, a sound source position detection program in the first exemplary embodiment of the present invention causes a computer to execute a process including the above-mentioned signal measurement step, reference signal acquisition step, weighting processing step, time synchronization correction calculation step, arrival time difference calculation step and sound source position calculation step.

Also by the sound source position detection program, the above-described effect achieved by the sound source position detection device 100 can be achieved.

Further, a recording medium in the first exemplary embodiment of the present invention stores a sound source position detection program for causing a computer to execute a process including the above-mentioned signal measurement step, reference signal acquisition step, weighting processing step, time synchronization correction calculation step, arrival time difference calculation step and sound source position calculation step.

Also by the recording medium, the above-described effect achieved by the sound source position detection device 100 can be achieved.

Second Exemplary Embodiment

Hereinafter, a sound source position detection device in a second exemplary embodiment of the present invention will be described. The sound source position detection device in the second exemplary embodiment of the present invention has basically the same configuration as that of the sound source position detection device 100 in the first exemplary embodiment (refer to FIGS. 1 to 3). Accordingly, a diagram showing the configuration of the sound source position detection device in the second exemplary embodiment will be omitted.

The sound source position calculation device in the present exemplary embodiment is different from the sound source position calculation device 100 in the first exemplary embodiment in that not only the measurement start time difference between the measurement devices 10a, 10b but also the sampling frequency difference is corrected. Accordingly, in the following description of the sound source position calculation device of the present exemplary embodiment, any description overlapping with that in the first exemplary embodiment will be omitted.

Figure 9:
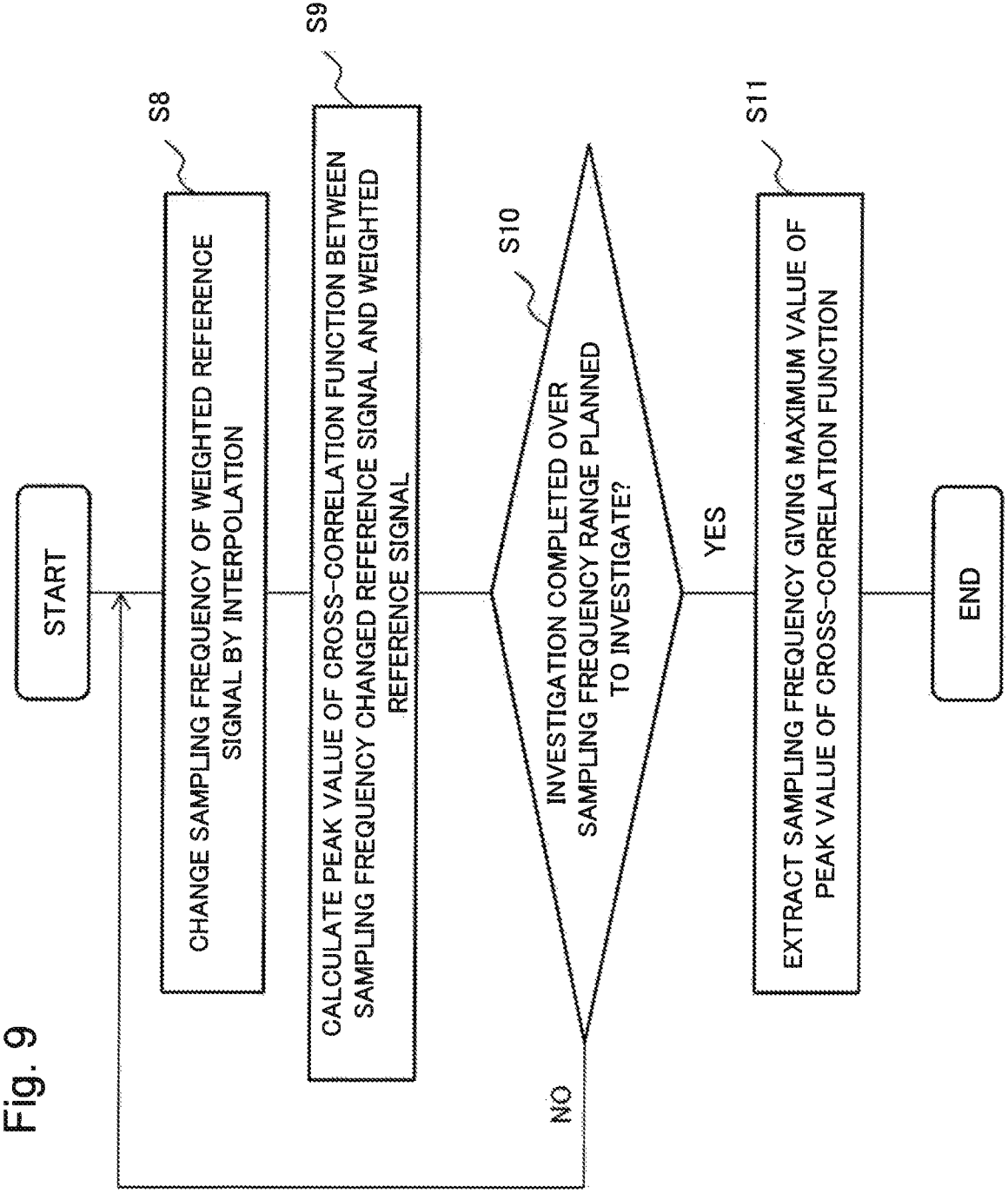
FIG. 9 is a diagram showing an operational flow of a sound source position detection device in a second exemplary embodiment of the present invention.

FIG. 9 is a diagram showing an operational flow of the sound source position detection device in the second exemplary embodiment of the present invention. FIG. 9 is a diagram particularly illustrating, in detail, process steps included in S4 of FIG. 4 which is a process performed in the time synchronization correction value calculation unit 24 of FIG. 3.

As shown in FIG. 9, first, the time synchronization correction value calculation unit 24 changes a sampling frequency of the weighted reference signals by interpolation (S8). First, the time synchronization correction value calculation unit 24 determines a plurality of sampling frequencies to investigate (hereafter assumed to be sampling frequencies f1, f2, . . . , fN). As examples of the plurality of sampling frequencies to investigate, those obtained by equally dividing a variability range, according to specifications, of the sampling frequency of timers installed in the measurement devices 10a and 10b by a required accuracy of the sampling frequency can be considered. The time synchronization correction value calculation unit 24 calculates a weighted reference signal for the measurement device 10a by interpolation such that the sampling frequency be equal to f1.

Next, the time synchronization correction value calculation unit 24 calculates a peak value of a cross-correlation function between a reference signal with a changed sampling frequency and a weighted reference signal (S9). Specifically, the time synchronization correction value calculation unit 24 calculates a peak value of a cross-correlation function between an interpolated reference signal for the measurement device 10a and a weighted reference signal for the measurement device 10b.

Next, the time synchronization correction value calculation unit 24 determines whether or not the investigation has been completed over a sampling frequency range planned to be investigated (S10). Specifically, the time synchronization correction value calculation unit 24 determines whether the currently investigated sampling frequency is fN. If the currently investigated sampling frequency is fN (Yes at S10), a sampling frequency fcomp for which a peak value of the cross-correlation function becomes largest is extracted (S11). A time difference giving a peak value of the cross-correlation function between an interpolated reference signal for the measurement device 10a at the extracted sampling frequency and the weighted reference signal for the measurement device 10b is determined to be a measurement start time difference. By performing correction of measured signal data by taking the above-mentioned sampling frequency fcomp and measurement start time difference as time synchronization correction values, highly accurate time synchronization becomes possible.

Figure 10:
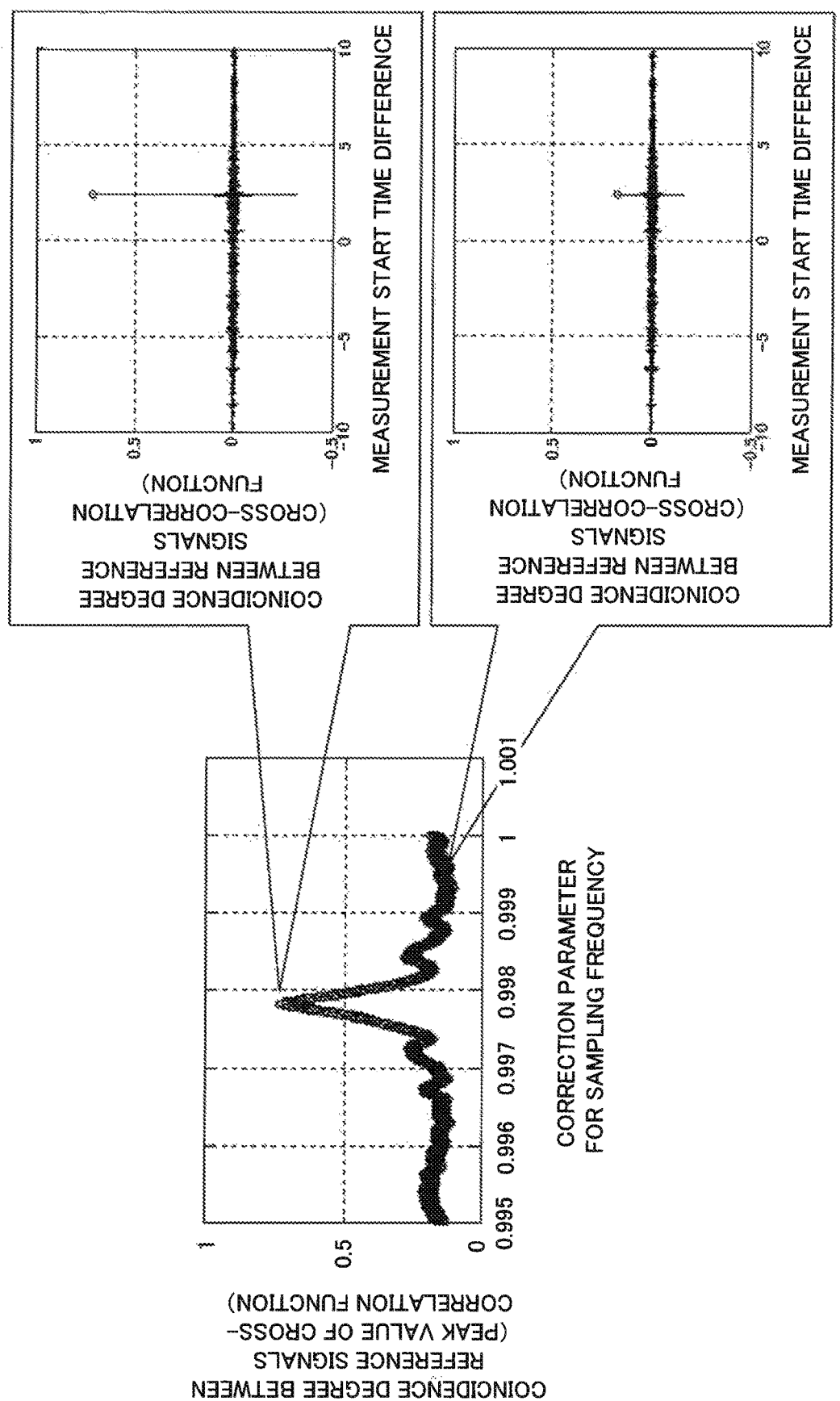
FIG. 10 is a diagram for explaining a process step shown in FIG. 9.

Further, the above-described process will be described specifically. FIG. 10 is a diagram for explaining the process steps shown in FIG. 9.

In the left drawing of FIG. 10, a sampling frequency correction parameter is set as the horizontal axis, and a coincidence degree between reference signals (a peak value of the cross-correlation function) is set as the vertical axis. The sampling frequency correction parameter represented by the horizontal axis is that obtained by normalizing an investigated sampling frequency by the original sampling frequency. The coincidence degree between reference signals (a peak value of the cross-correlation function) represented by the vertical axis is a peak value of the cross-correlation function between an interpolated reference signal for the measurement device 10a and the weighted reference signal for the measurement device 10b.

Changing the sampling frequency, as shown in the upper right and lower right drawings of FIG. 10, a largest one of peak values of the cross-correlation function between an interpolated reference signal for the measurement device 10a and the weighted reference signal for the measurement device 10b is determined as the sampling frequency fcomp.

As has been described above, in the sound source position detection device in the second exemplary embodiment of the present invention, time synchronization correction values include a correction value for the measurement start time difference and a correction value for a given sampling frequency difference included in measured signals.

Thus, in the present exemplary embodiment, correction is performed not only on the measurement start time difference between the measurement devices 10a and 10b but also on the sampling frequency difference, and as a result, highly accurate calculation of a sound source position is possible even using measurement devices provided with low cost timers having a large individual difference in sampling frequency. The fact that such low cost timers can be used becomes important in applications using a large number of measurement devices, such as a sensor network.

Third Exemplary Embodiment

Figure 11:
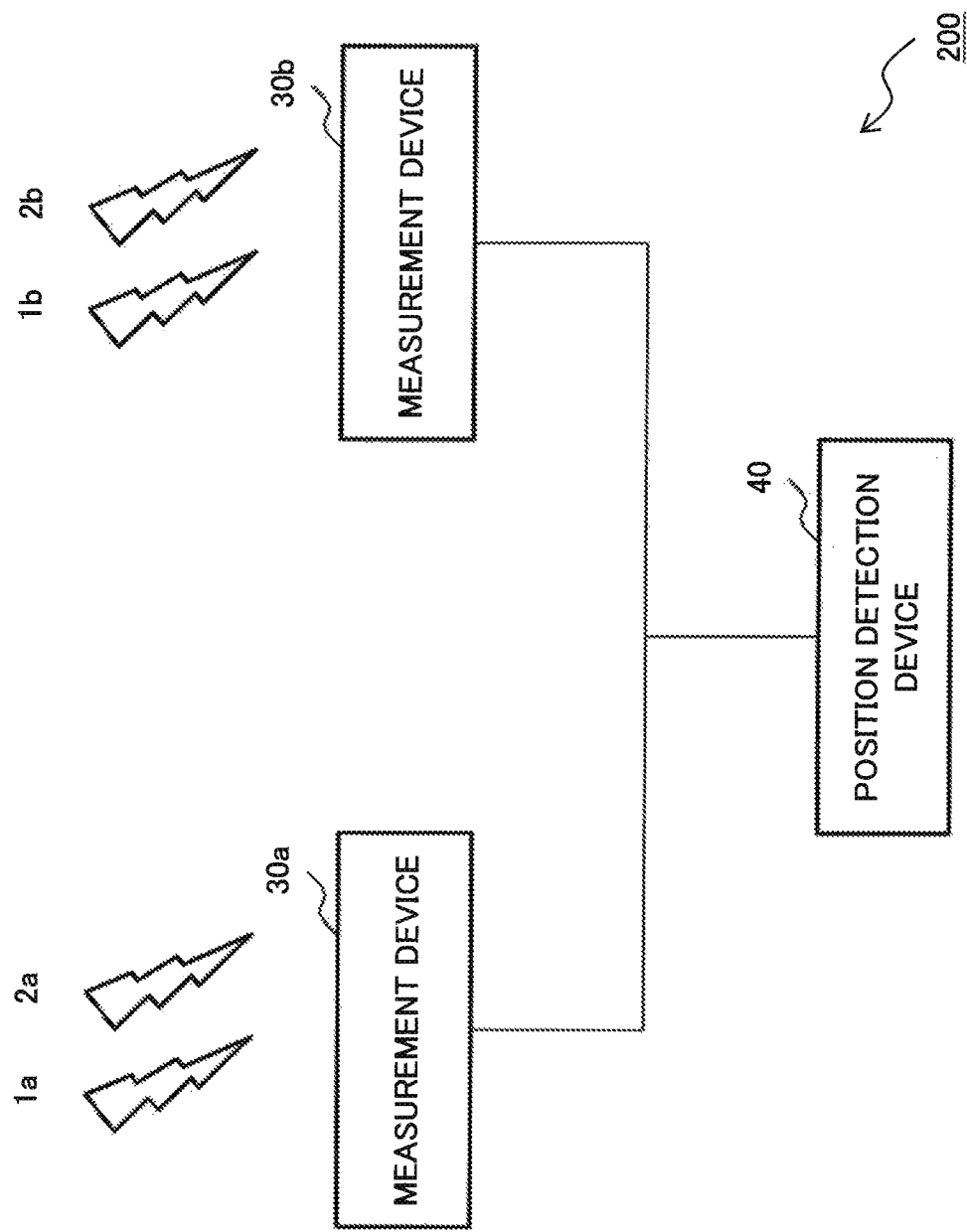
FIG. 11 is a diagram showing a schematic configuration of a sound source position detection device in a third exemplary embodiment of the present invention.

A configuration of a sound source position detection device 200 in a third exemplary embodiment of the present invention will be described. FIG. 11 is a diagram showing a schematic configuration of the sound source position detection device 200 in the third exemplary embodiment of the present invention. In FIG. 11, to constituent elements equivalent to the respective constituent elements shown in FIGS. 1 to 10, equivalent signs to those shown in FIGS. 1 to 10 are assigned.

The sound source position calculation device 200 in the present exemplary embodiment is different from the sound source position detection device 100 in the first exemplary embodiment in that it uses a plurality of reference signals. Accordingly, in the following description of the sound source position calculation device of the present exemplary embodiment, any description overlapping with that in the first exemplary embodiment will be omitted.

As shown in FIG. 11, the sound source position detection device 200 includes two measurement devices 30a and 30b and a position detection device 40. Here, the two measurement devices 30a and 30b are a pair of measurement devices. When there is no need of distinguishing between the two measurement devices 30a and 30b, they are collectively referred to as a measurement device 30.

Each of the measurement device 30a and the measurement device 30b is communicatively coupled with the position detection device 40 by wired or wireless.

As shown in FIG. 11, the measurement device 30a receives reference signals 1a and 2a. The measurement device 30b receives reference signals 1b and 2b. In the present case, each of the measurement devices 10a and 10b uses two reference signals. However, each of the measurement devices 10a and 10b may use three or more reference signals.

Figure 12:
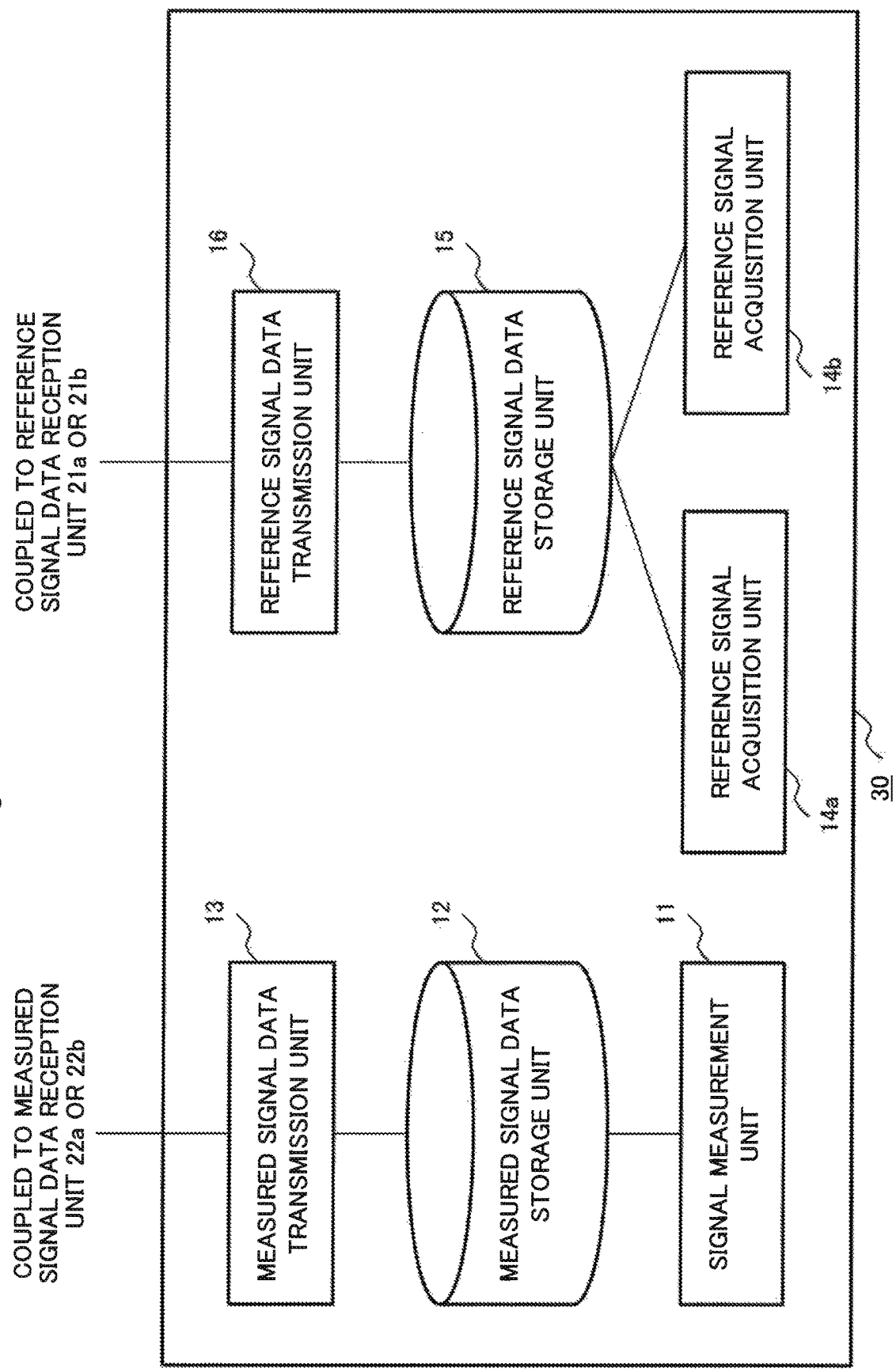
FIG. 12 is a diagram showing a configuration of a measurement device.

Next, a configuration of the measurement devices 30a and 30b will be described. FIG. 12 is a diagram showing a configuration of the measurement device 30 (30a, 30b).

Each of the measurement device 30a and the measurement device 30b has the following configuration. That is, as shown in FIG. 12, the position detection device 30 (30a, 30b) includes a signal measurement unit 11, a measured signal data storage unit 12, a measured signal data transmission unit 13, reference signal acquisition units 14a and 14b, a reference signal data storage unit 15 and a reference signal data transmission unit 16.

Here, comparison between FIG. 2 and FIG. 12 will be made. In FIG. 2, the single reference signal acquisition unit 14 is provided in the measurement device 10. In contrast, in FIG. 12, the two reference signal acquisition units 14a and 14b are provided in the measurement device 30.

As shown in FIG. 12, the reference signal acquisition units 14a and 14b are coupled to the reference signal data storage unit 15. The reference signal acquisition units 14a and 14b each have basically the same function as that of the reference signal acquisition unit 14 of FIG. 2

For example, the reference signal acquisition units 14a and 14b each receive a reference signal through a radio wave of such as radio broadcast and GPS signals. The reference signal acquisition units 14a and 14b each output the acquired reference signal to the reference signal data storage unit 15. There, the reference signal acquisition units 14a and 14b may receive reference signals simultaneously with each other and store the reference signals, in a manner to combine them together, into the reference signal data storage unit 15. The reference signal acquisition units 14a and 14b may also periodically switch a reference signal to receive and store thus received reference signals into the reference signal data storage unit 15.

Further, the reference signal acquisition units 14a and 14b may store, into the reference signal data storage unit 15, a reference signal having a best signal to noise ratio at each of placement sites of the respective measurement devices 30a and 30b. In the case of using a reference signal having a best signal to noise ratio at each of placement sites of the respective measurement devices 30a and 30b, it may occur that the used reference signal is different between the plurality of measurement devices 30a and 30b. Because of the reason, all of the reference signals may be recorded by another recording device different from the reference signal data storage unit 15. Accordingly, by taking the reference signals recorded in the another recording device as master reference signal data and comparing the data with reference signals of the respective measurement devices 30a and 30b, time synchronization can be performed.

Figure 13:
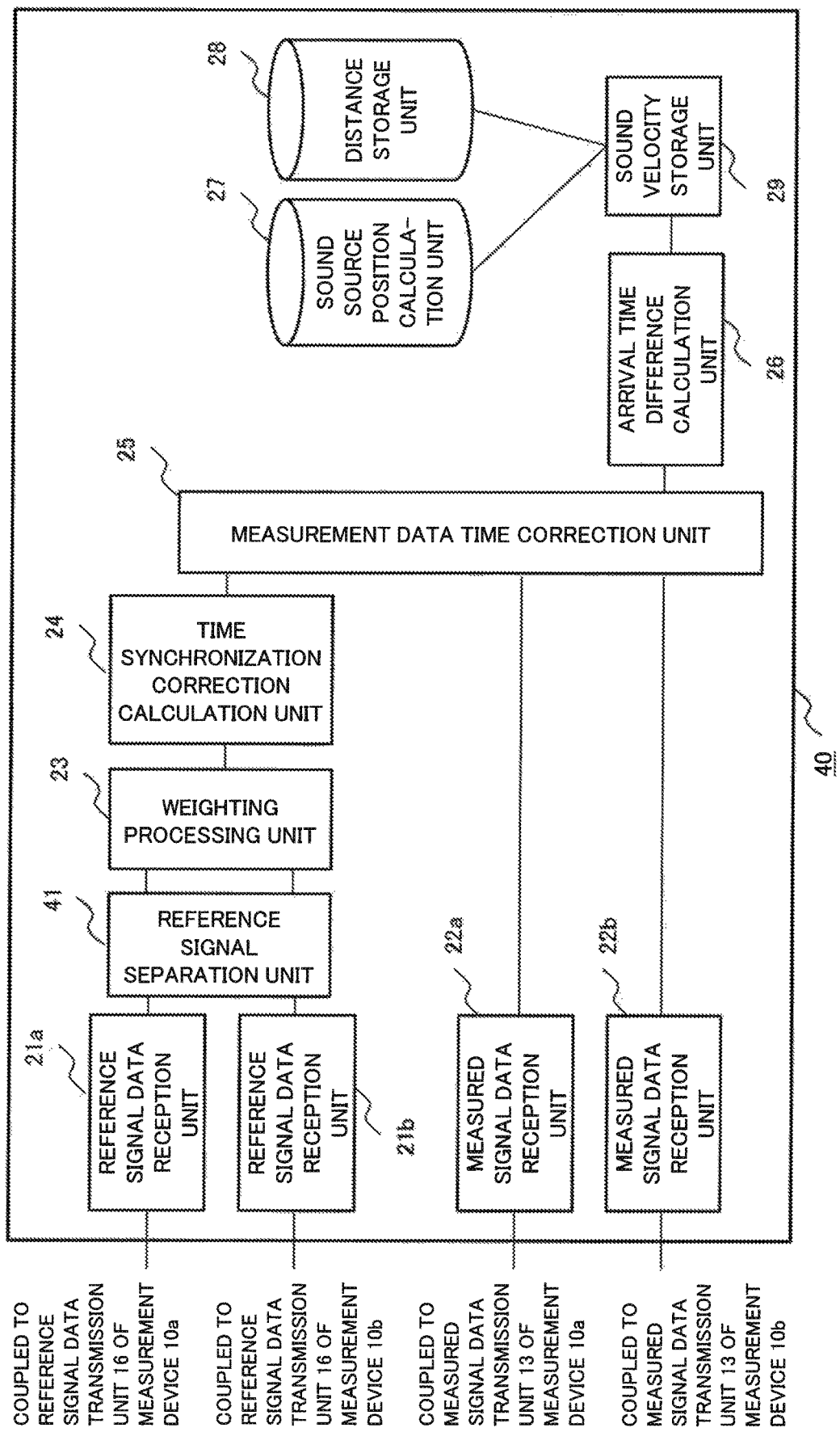
FIG. 13 is a diagram showing a configuration of a position detection device.

Next a configuration of the position detection device 40 will be described. FIG. 13 is a diagram showing the configuration of the position detection device 40.

As shown in FIG. 13, the position detection device 40 includes reference signal data reception units 21a and 21b, measured signal data reception units 22a and 22b, a reference signal separation unit 41, a weighting processing unit 23, a time synchronization correction calculation unit 24, a measured data time correction unit 25, an arrival time difference calculation unit 26, a sound velocity storage unit 27, a distance storage unit 28 and a sound source position calculation unit 29.

Here, comparison of FIG. 13 with FIG. 3 will be made. FIG. 13 is different from FIG. 3 in that the reference signal separation unit 41 is further provided.

As shown in FIG. 13, the reference signal separation unit 41 is coupled to the reference signal data reception units 21a and 21b and the weighting processing unit 23. The reference signal separation unit 41 separates reference signals received by the reference signal data reception units 21a and 21b. For example, the reference signal separation unit 41 separates reference signals received by the reference signal data reception units 21a and 21b into individual reference signals acquired by the respective reference signal acquisition units 14a and 14b. By thus providing the reference signal separation unit 41, it becomes possible to perform more accurate time synchronization when reception intensity of the plurality of reference signals is different between the measurement devices 30a and 30b.

The weighting processing unit 23 weights each of the reference signals separated by the reference signal separation unit 41, thereby creating weighted reference signals.

The time synchronization correction value calculation unit 24 calculates a time synchronization correction value in terms of each of the plurality of weighted reference signals.

The measured data time correction unit 25 may perform time synchronization of measured signal data using an average of the time correction value calculated in terms of each of the reference signals, and accordingly create time synchronization corrected measured signals.

The configuration of the sound source position detection device 200 has been described above.

Figure 14:
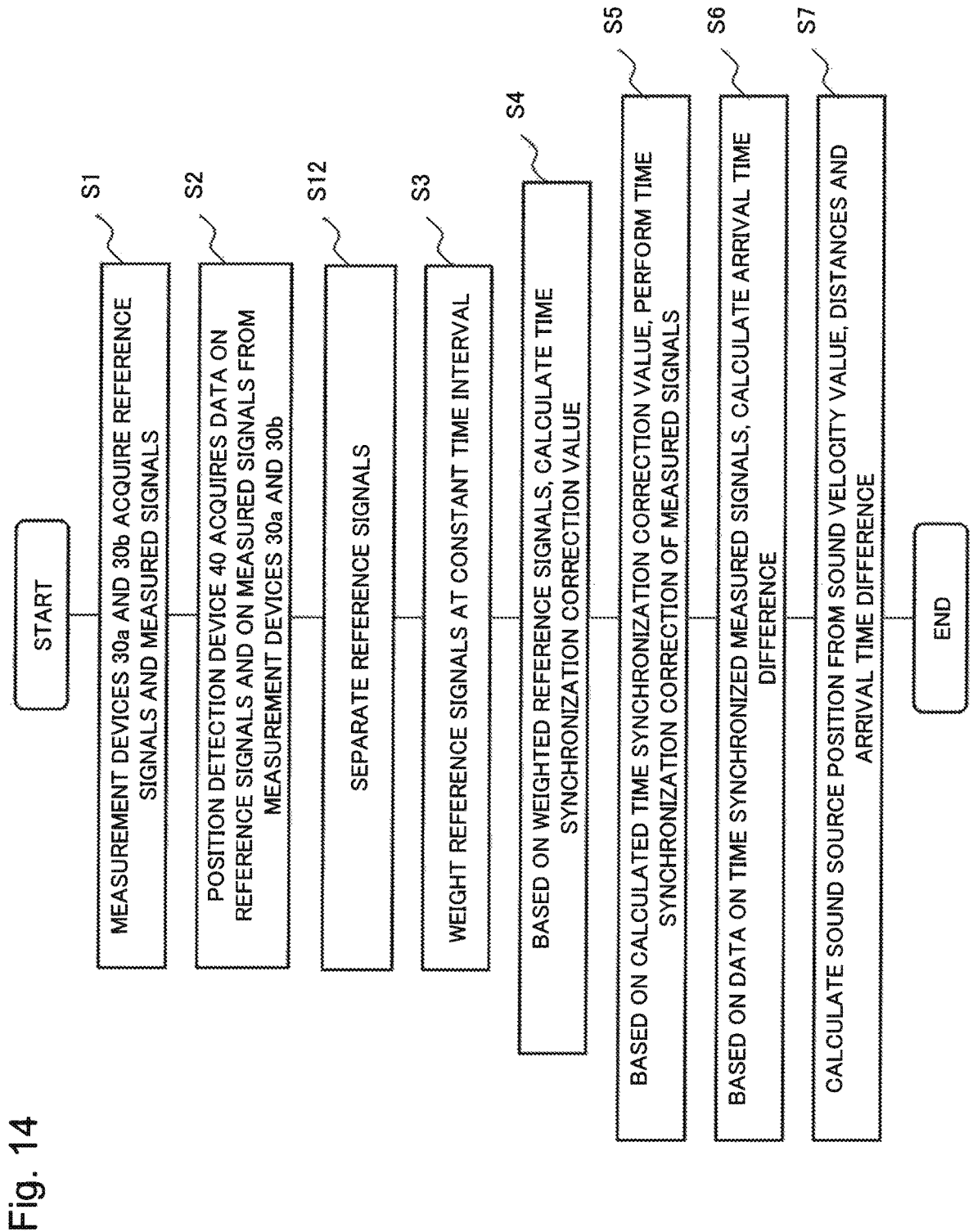
FIG. 14 is a diagram showing an operational flow of the sound source position detection device in the third exemplary embodiment of the present invention.

Next, operation of the sound source position detection device 200 will be described. FIG. 14 is a diagram showing an operational flow of the sound source position detection device 200.

Here, comparison of FIG. 14 with FIG. 4 will be made. FIG. 14 is different from FIG. 4 in that S12 is added. Here, a description will be given mainly of a different point from the description of FIG. 4, and any content overlapping with the description of FIG. 4 will be omitted.

As shown in FIG. 14, the position detection device 40 separates reference signals after the process of S2 (S12). Specifically, the reference signal separation unit 41 separates reference signals received by the reference signal data reception units 21a and 21b into individual signals. For example, in a case the measurement devices 10a and 10b receive reference signals in a manner of periodically switching a reference signal to receive, the reference signal data storage unit 15 stores also information on time at which a reference signal is changed, at the same time when data on the reference signal is stored. Based on the information, the reference signal separation unit 410 can separate reference signals. In a case where the measurement devices 10a and 10b each receive a plurality of reference signals simultaneously, the reference signal separation unit 41 can separate reference signals by signal processing.

Next, the position detection device 20 weights reference signals at a constant interval of time (S3).

Specifically, the weighting processing unit 23 creates weighted reference signals by weighting the reference signals separated by the reference signal separation unit 41 at a constant interval of time. The weighting processing unit 23 outputs the weighted reference signals to the time synchronization correction calculation unit 24.

Steps after S4 are the same as that described in the first exemplary embodiment.

The operation of the sound source position detection device 200 has been described above.

As has been described above, in the sound source position detection device 200 in the third exemplary embodiment of the present invention, the pair of reference signal acquisition units 14 each acquire a plurality of kinds of reference signals different from each other. The weighting processing unit 23 creates weighted reference signals by weighting each of the plurality of kinds of reference signals acquired by each of the reference signal acquisition units 14.

Thus, in the present exemplary embodiment, by the use of a plurality of reference signals, highly accurate time synchronization can be performed even when one of the reference signals cannot be received. As a result, a sound source position can be calculated with high accuracy. For example, in a case of a site which is difficult for a radio wave to reach, such as the underground, there is a possibility that time synchronization cannot be performed with only one reference signal, but the risk can be lowered by the use of a plurality of reference signals.

The device of each of the exemplary embodiments is realized by any combination of hardware and software including mainly any computer CPU, memory, program loaded on the memory, storage unit storing the program such as a hard disk, and interface for network connection. The above-mentioned program includes, besides a program already stored in the memory since a stage of shipping the device, also a program downloaded from a recording medium such as a CD, a server on the Internet or the like. There may be various modified examples of the realization method and the device, which should be understood by those skilled in the art.

The functional block diagrams used in describing the exemplary embodiments each show a configuration not in terms of hardware units but in terms of functional units. While, in those diagrams, each device is illustrated as being realized by a single apparatus, the realization means is not limited to that. That is, either a physically divided configuration or a logically divided one may be employed.

As above, the present invention has been described based on the exemplary embodiments. An exemplary embodiment is just an illustration, and various kinds of changes, addition or subtraction and combinations may be added to each of the above-mentioned exemplary embodiments unless it deviates from the main points of the present invention. It is understood by a person skilled in the art that modification made by adding such changes, addition/subtraction and combinations are also included in the scope of the present invention. While the present invention has been described above with reference to the exemplary embodiments (and other examples), the present invention is not limited to the above-described exemplary embodiments (and other examples). To the configurations and details of the present invention, various modifications understandable to those skilled in the art may be made within the scope of the present invention.

REFERENCE SIGNS LIST 10, 10a, 10b measurement device
11 signal measurement unit
12 measured signal data storage unit
13 measured signal data transmission unit
14 reference signal acquisition unit
15 reference signal data storage unit
16 reference signal data transmission unit
20 position detection device
21a, 21b reference signal data reception unit
22a, 22b measured signal data reception unit
23 weighting processing unit 24 time synchronization correction calculation unit
25 measured data time correction unit
26 arrival time difference calculation unit
27 sound velocity storage unit
28 distance storage unit
29 sound source position calculation unit
30, 30a, 30b measurement device
40 position detection device
100, 200 sound source position detection device

The invention claimed is:

1. A sound source position detection device including:
a processor; and
memory storing executable instructions that, when executed by the processor, causes the processor to perform as:
a pair of signal measurement units disposed separately from each other and each configured to measure a signal output from a sound source as a measured signal;
reference signal acquisition units each configured to acquire a reference signal;
a weighting processing unit configured to create weighted reference signals by weighting the reference signals measured by the respective reference signal acquisition units;
a time synchronization correction calculation unit configured to calculate a time synchronization correction value on the basis of the weighted reference signals, the time synchronization correction value being a correction value for synchronizing the two measured signals measured by respective ones of the pair of signal measurement units with each other;
an arrival time difference calculation unit configured to calculate an arrival time difference on the basis of the time synchronization correction value, the arrival time difference being a difference between elapsed times for the two measured signals measured by respective ones of the pair of signal measurement units to arrive at the respective ones of the pair of signal measurement units; and
a sound source position calculation unit configured to calculate a position of the sound source on the basis of the arrival time difference,
wherein the weighting processing unit generates weighted reference signals by weighting each of the reference signals acquired by the reference signal acquisition units on the basis of a signal to noise ratio of the reference signal.

2. The sound source position detection device according to claim 1,
wherein the weighting processing unit creates weighted reference signals by weighting each of the reference signals acquired by the reference signal acquisition units on the basis of an auto-correlation function value of the reference signal.

3. The sound source position detection device according to claim 1,
wherein the time synchronization correction value is a correction value for a measurement start time difference which is a difference between times at which respective ones of the pair of signal measurement units start measuring the measured signals.

4. The sound source position detection device according to claim 1,
wherein the time synchronization correction value includes a correction value for the measurement start time difference and a correction value for a certain sampling frequency difference included in the measured signals.

5. The sound source position detection device according to claim 1,
wherein the reference signal acquisition units each acquire a plurality of kinds of reference signals different from each other, and
the weighting processing unit creates weighted reference signals by weighting each of the plurality of kinds of reference signals acquired by the reference signal acquisition units.

6. The sound source position detection device according to claim 1,
wherein the reference signals are radio broadcast signals.

7. A sound source position detection method comprising:
measuring a signal output from a sound source by a pair of signal measurement units disposed separately from each other, as measured signals;
acquiring reference signals;
creating weighted reference signals by weighting the reference signals;
calculating a time synchronization correction value on the basis of the weighted reference signals, the time synchronization correction value being a correction value for synchronizing the two measured signals measured by respective ones of the pair of signal measurement units with each other;
calculating an arrival time difference on the basis of the time synchronization correction value, the arrival time difference being a difference between elapsed times for the two measured signals measured by respective ones of the pair of signal measurement units to arrive at the respective ones of the pair of signal measurement units;
calculating a position of the sound source on the basis of the arrival time difference; and
generating weighted reference signals by weighting each of the reference signals acquired on the basis of a signal to noise ratio of the reference signal.

8. A recording medium storing a sound source position detection program for causing a computer to execute a process comprising:
measuring a signal output from a sound source by a pair of signal measurement units disposed separately from each other, as measured signals;
acquiring reference signals;
creating weighted reference signals by weighting the reference signals;
calculating a time synchronization correction value on the basis of the weighted reference signals, the time synchronization correction value being a correction value for synchronizing the two measured signals measured by respective ones of the pair of signal measurement units with each other;
calculating an arrival time difference on the basis of the time synchronization correction value, the arrival time difference being a difference between elapsed times for the two measured signals measured by respective ones of the pair of signal measurement units to arrive at the respective ones of the pair of signal measurement units;
calculating a position of the sound source on the basis of the arrival time difference; and
generating weighted reference signals by weighting each of the reference signals acquired on the basis of a signal to noise ratio of the reference signal.

* * * * *